United States Patent [19]

Dower et al.

[11] Patent Number: 4,845,496
[45] Date of Patent: Jul. 4, 1989

[54] ELECTRO-OPTICAL DISPLACEMENT SENSOR

[76] Inventors: Roger G. Dower, Box 46444, Station G; Dale C. Penner, #305 - 8770 Montcalm Street; Robert S. Hannebauer, #303 - 153 Powell Street, all of Vancouver, British Columbia, Canada

[21] Appl. No.: 100,486

[22] Filed: Sep. 24, 1987

[51] Int. Cl.[4] .............................................. H03M 1/22
[52] U.S. Cl. ......................................... 341/13; 341/1; 341/14; 250/237 G; 33/1 D
[58] Field of Search ....................... 340/347 P, 347 M; 250/231 SE, 237 R, 237 G, 561; 357/24; 33/1 D, 125 A; 341/1, 13, 14, 126, 137

[56] References Cited

U.S. PATENT DOCUMENTS

| | | | |
|---|---|---|---|
| 3,882,302 | 5/1975 | Deichmiller et al. | 377/24 |
| 4,047,025 | 9/1977 | Lemelson | 341/13 |
| 4,100,420 | 7/1978 | Metcalf et al. | 250/231 SE X |
| 4,572,952 | 2/1986 | March | 341/13 |

Primary Examiner—Bernard Roskoski
Assistant Examiner—Brian Young
Attorney, Agent, or Firm—Klarquist, Sparkman, Campbell, Leigh, & Whinston

[57] ABSTRACT

An electro-optical displacement sensor comprises an optical source including a plurality of optical grating lines for producing from an incident optical signal a transmitted optical signal having a spatially periodic intensity pattern. Optical sensing means receives the transmitted signal as an input across a plurality of optical receptors, each of which receptors provides an output signal corresponding to the amplitude of the transmitted signal as sensed by the receptor. The receptors are spaced one from the other by a distance different from the fundamental spatial wavelength of the transmitted signal. Signal conditioning means derive a signal vector from the receptor output signals, the signal vector than being processed to derive first and second independent component signals. The component signals are then combined to produce an interpolated phase signal corresponding to the interpolated position of the grating lines relative to the optical receptors.

10 Claims, 12 Drawing Sheets

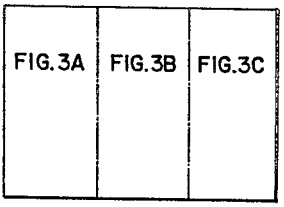

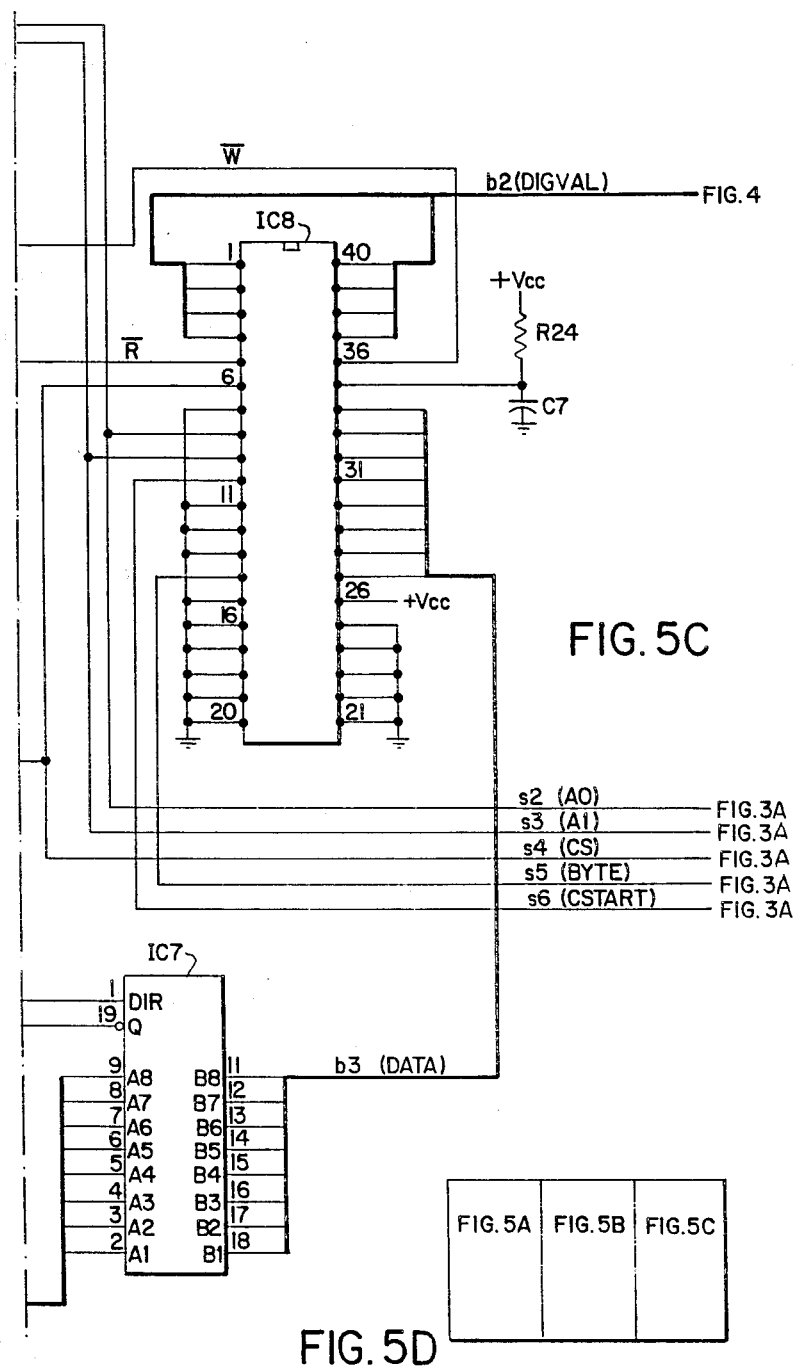

ELECTRO-OPTICAL DISPLACEMENT SENSOR

FIELD OF THE INVENTION

This invention relates to electro-optical apparatus for measuring displacement.

BACKGROUND OF THE INVENTION

Accurate electro-optical displacement measurement of a single spatial dimension has been accomplished using interferometric and moiré techniques.

Interferometric methods use the wavelength of a light source as a reference for measuring displacement, and typically require expensive precision optical components. Interference fringes are counted yielding a value representative of displacement.

Moiré grating methods use the wavelength or pitch of optical gratings as their reference. Displacement is measured by detecting the relative position of two (more in some cases) such gratings. Typically, this is done using a relatively small number of photodetectors that detect two optical signals differing in phase by $\pi/2$ and modulated by the gratings. In a vernier-type moiré method that allows for interpolation between moiré fringes by eye, two gratings differing slightly in pitch are used. However, the resolution attainable by a small number of photodetectors is low. Also, the human eye is limited in its ability to read vernier scales.

A variation of the moiré method is described in U.S. Pat. No. 4,529,964 granted on July 16, 1985 (Minami et al.). As disclosed in this patent, an array of photodetectors is used to detect an optical signal modulated by a single optical grating. (The optical grating can be considered as a main scale and the array of photodetectors as a vernier scale). From the optical data read by the array, a signal processing means determines an interpolated optical phase angle corresponding to interpolated displacement by following a 'phase inverting' point. However, the precision of interpolation is limited to the data from only one data point out of the photodetector data array.

In interferometric surface profiling applications, Fourier analysis in both the temporal and spatial domains has been used to interpolate displacements perpendicular to the measuring device. Video tubes and charge coupled devices ("CCDs") are used to capture a matrix of displacement data which is used to analyze the surface under test. However, while these techniques work well to measure a 3 dimensional surface, the precision of each individual displacement measurement is not extreme. An example of spatial Fourier analysis applied to surface profiling can be found in Traditional and Synchronous Convolution Methods for Processing Fringe Pattern Images", Womack, K.H., Ph.D. dissertation, University of Arizona, 1982.

Transform methods such as the Fast Fourier Transform ("FFT") have been used to calculate phase. In "Fourier-transform method of fringe-pattern analysis for computer-based topography and interferometry", J Opt Soc. Am., Vol. 72, No. 1, January 1982, Takeda et al. discuss the use of the FFT for fringe pattern analysis.

An object of the present invention is to provide new and improved apparatus for measuring displacement.

A further object of the present invention is to provide new and improved opto-electronic apparatus capable of high resolution displacement measurements.

SUMMARY OF THE INVENTION

In accordance with a broad aspect of the present invention, there is provided a displacement sensor comprising an optical grating, optical sensing means having a plurality of optical receptors, signal conditioning means operatively connected to the optical sensing means for receiving output signals from the optical receptors as an input and for deriving a signal vector therefrom, signal processing means operatively connected to the signal conditioning means for deriving two independent component signals from the signal vector, and signal combining means operatively connected to the signal processing means for receiving the component signals and for combining same to produce an interpolated phase signal corresponding to the interpolated position of the grating lines relative to the optical receptors.

The optical grating produces from an incident optical signal input a transmitted optical signal having a spatially periodic intensity pattern. The transmitted signal is received across the receptors of the optical sensing means, each receptor providing an output signal corresponding to the amplitude of the transmitted signal as received by the receptor. Such receptors are spaced one from the other by a distance different than the fundamental spatial wavelength of the transmitted signal.

The interpolated position of the grating lines relative to the optical receptors is a measure of "interpolated" displacement, and this is to be distinguished from gross displacement. Herein, "interpolated" displacement refers to a fractional displacement less than the distance between adjacent optical grating lines.

Typically, the displacement sensor will include means for producing optical energy and means for collimating such energy into the incident optical signal. Herein, it is to be understood that the term "optical" or "optical energy" is not confined to the light region normally visible to the human eye.

Preferably, the optical sensors are charge storage elements such as charge coupled devices for storing an electrical charge related to the intensity of optical energy incident on the element. With commercially available CCDs, this enables the incident optical energy to be measured at a large number of closely spaced points. With analog to digital conversion of the resulting analog signals, the input data is readily conditioned for digital processing.

As will be seen hereinafter, the signal vector derived by the signal conditioning means may be processed in a variety of ways for ultimately deriving an output interpolated phase signal corresponding to interpolated position. One such way involves deriving the independent component signals from the inner product of the signal vector with independent reference signals. Another such way involves performing a Fast Fourier Transfrom (FFT) on the signal vector.

BRIEF DESCRIPTION OF THE DRAWINGS

The invention will now be described with reference to the drawings in which:

FIGS. 3a through 3d show in more detail the Clock, EPLD, and CCD driver circuit of FIG. 2.

FIGS. 5a through 5d show in more detail the PC I/O interface circuit shown in FIG. 2.

DETAILED DESCRIPTION

Figure 1:
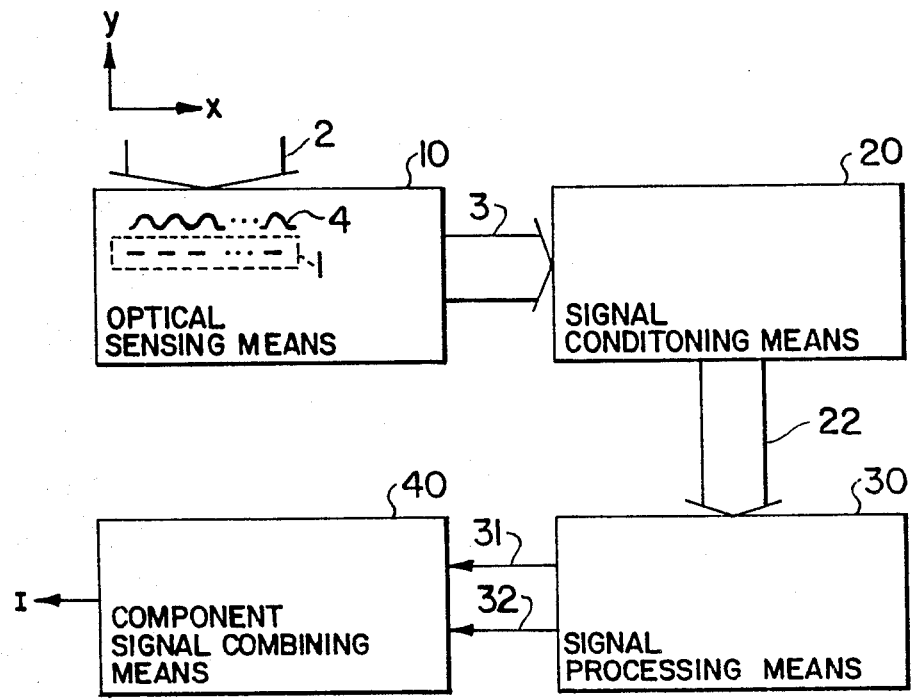
FIG. 1 is a conceptual diagram of phase detection apparatus for interpolating the spatial phase of an optical signal to a high accuracy, and which forms part of a displacement sensor in accordance with the present invention.

As a preliminary point, it may be noted that the following conventions have been used in the disclosure and drawings. The letter "s" when used in the designation of a conductor (e.g. s7) indicates a single conductor. Similarly, the letter "b" when used in the designation of a conductor indicates a multi-conductor bus. When the term "low" is used in reference to the status of a signal, the meaning is a logical low or logical zero state. Similarly, when the term "high" is used in reference to the status of a signal, the meaning is a logical high or logical one state. In the drawings, the complement of a signal is indicated by a line over the signal's designation. However, in the disclosure, this same complement is indicated by the symbol "*" (e.g. the complement of signal RD would be indicated by "*"RD).

GENERAL CONCEPTS

FIG. 1 is a conceptual diagram of an optical phase detector for interpolating the spatial phase of an optical signal (modulo $2\pi$) to a high accuracy. Photodetector Array (PHA) 1 within Optical Sensing Means (DSM) 10 produces a vector of electrical signals in response to Incident Optical Signal (IOS) 2. OSM 10 modifies the photodetector array 1 electrical signals and then passes them via line 3 to Signal Conditioning Means (SCM) 20. SCM 20 conditions to the signals on line 3 and transmits the resulting signal vector via line 22 to Signal Processing Means (SPM) 30. SPM 30 processes the vector received on line 22 to produce output signals on lines 31 and 32. Component Signal Combining Means 40 derives the interpolated phase I of the optical signal by combining the signals on 31 and 32.

IOS 2 has a spatial intensity pattern periodic in the X spatial direction (the X spatial direction is indicated in FIG. 1 by the linear coordinate axis labelled X, but should not be taken to suggest that the phase detection scheme is limited to a linear configuration. Rather, in this embodiment, the X direction is chosen to be linear for ease of description, and it should be understood that the phase detection technique will work just as well if X describes a non-linear displacement, such as a curve, for example, for use in a rotary sensor). It is the phase of the fundamental frequency of this spatial intensity pattern that is to be interpolated. Spatial Intensity Pattern (SIP) 4 of IOS 2 is diagrammatically shown in FIG. 1 as a near perfect sinusoid for ease of description only. The intensity pattern is not required to be a perfect sinusoid, since the phase interpolation process to be described is relatively insensitive to frequencies other than the fundamental. PHA 1 comprises a plurality of photodetectors arranged in a regular fashion with equal spacing between neighbours. The spacing is chosen to be different than the wavelength of SIP 4, such that over a given distance L, if the number of photodetectors is N, then the number of wavelengths of SIP 4 is approximately N+1. This arrangement causes the signal vector generated by PHA 1 to exhibit a pattern with a fundamental wavelength approximately equal to L, and a phase equal to the spatial phase of IOS 2.

The linear displacement sensor to be described, comprises these basic parts: optical apparatus for producing IOS 2 corresponding to the displacement to be measured, apparatus (partially including software implementation) embodying the previously described phase detector to interpolate the corresponding SIP 4 to a high accuracy, and apparatus for determining the 'gross' spatial phase (phase angles=$2n\pi$, where n is an integer) of the optical signal. As will become apparent, some of the apparatus functions performed are performed within a software environment, but this environment is not essential to the invention.

IOS 2 produced by the linear displacement sensor consists of light modulated by an optical grating translated by the displacement to be measured. The grating has an additional line scribed upon it, for use in the gross phase determination. The effect of the line on the interpolation process is compensated for within software to be described. The sensor combines the interpolated and grass phases to yield an accurate overall spatial phase angle of the modulated optical signal, thus determining the position of the grating and therefore of the displacement to be measured, to a high accuracy.

In this particular sensor, the spacing of the photodetectors and the wavelength of SIP 4 are such that the given distance L is approximately equal to the length of PHA 1. The precise value of L is not critical, since by analyzing the analog data output of PHA 1, using appropriate test equipment such as an oscilloscope, the characteristic wavelengths and frequencies of the signal vector can be determined visually. This approach will compensate for varying optical geometries. A CCD is used for PHA 1.

HARDWARE DESCRIPTION

Figure 2:
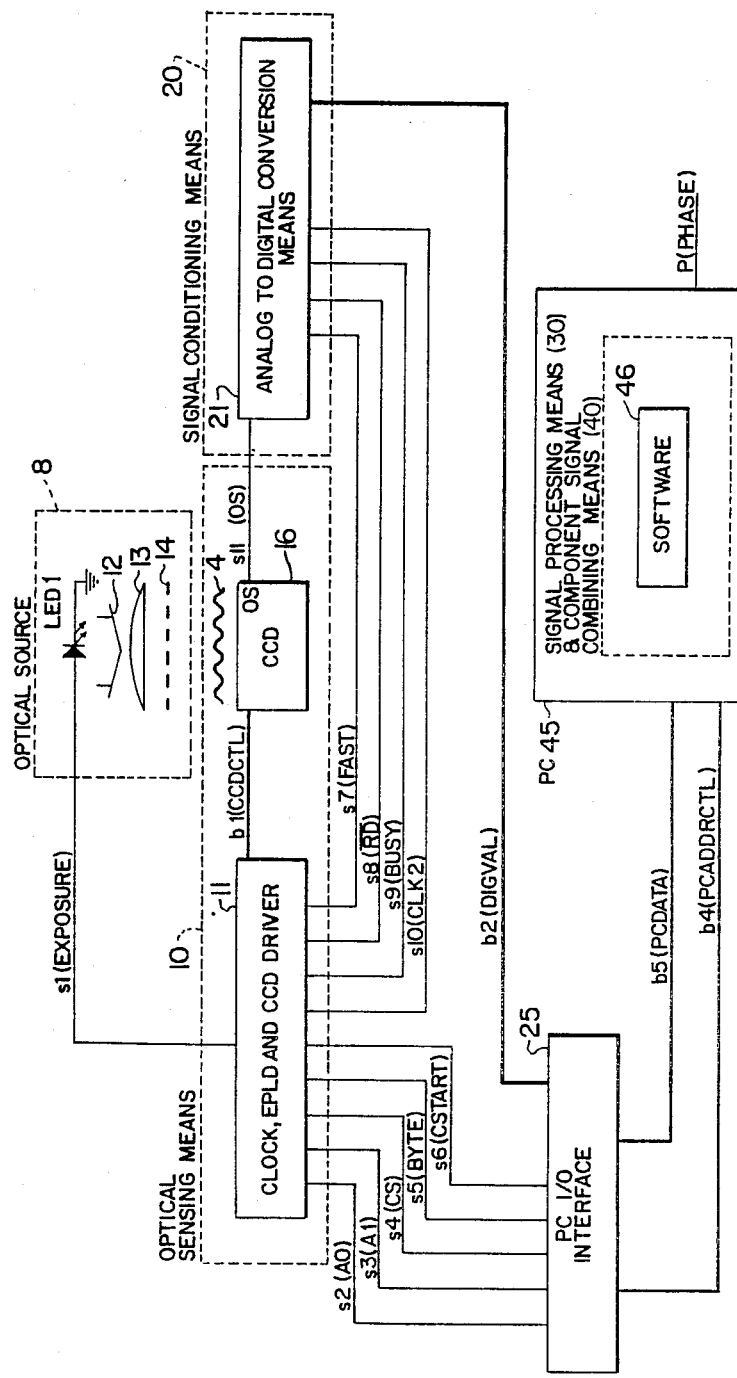
FIG. 2 is a block diagram of a preferred embodiment of a displacement sensor in accordance with the present invention, in a configuration for measuring linear displacements.

The hardware portions of a preferred embodiment of the displacement sensor, used as a linear sensor, will now be described withreference to FIGS. 2 through 5d. FIG. 2 is a block diagram of the sensor. FIGS. 3a to 5d are more detailed diagrams of circuits appearing in FIG. 2. As can be seen in FIG. 2, the displacement sensor comprises an Optical Source 8, including light emitting diode LED 1, collimating lens 13, and optical grid 14, an Optical Sensing Means 10, including CCD 16; Signal Conditioning Means 20, including an Analog to Digital Conversion Means 21; and Signal Processing Means 30 and Component Signal Combining Means 40 embodied within a computer designated PC45.

Clock, EPLD (Erasable Programmable Logic Device), and CCD Driver (CECD) 1, which form part of Optical Sensing Means 10 in FIG. 2, produce required timing signals for the rest of the circuits.

Figure 3A:
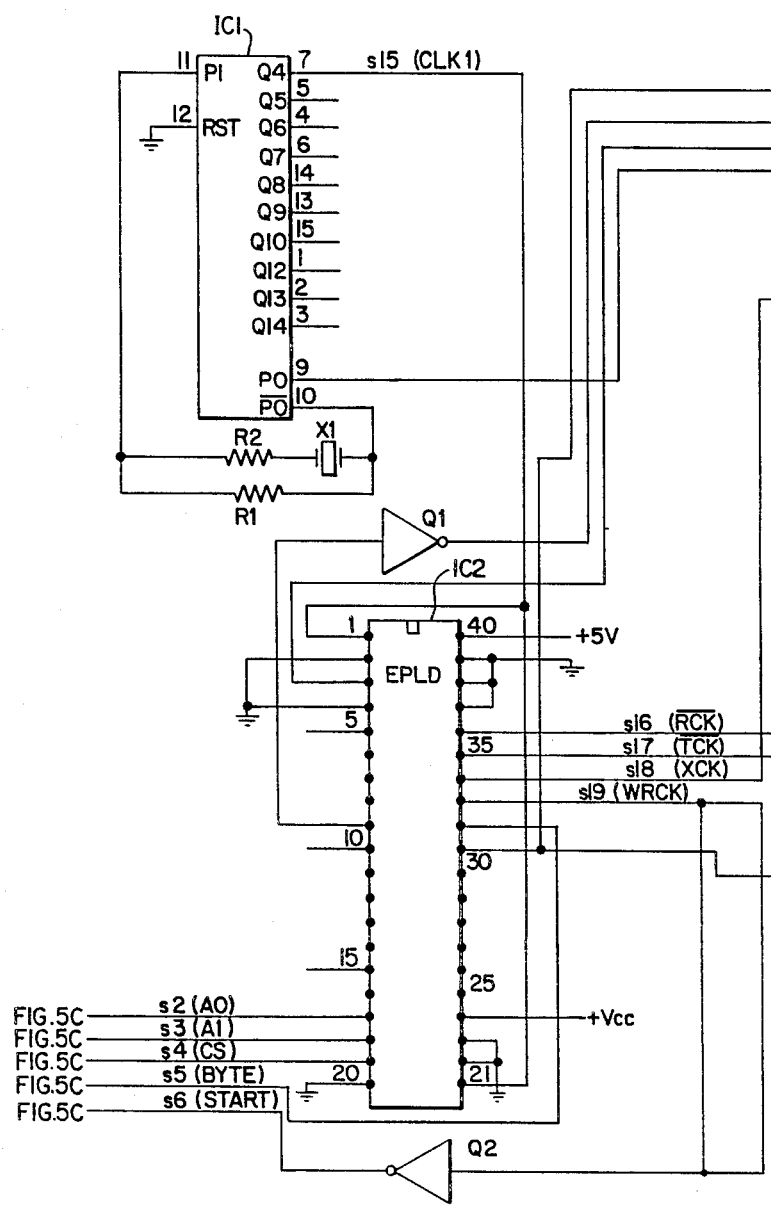
Figure 3B:
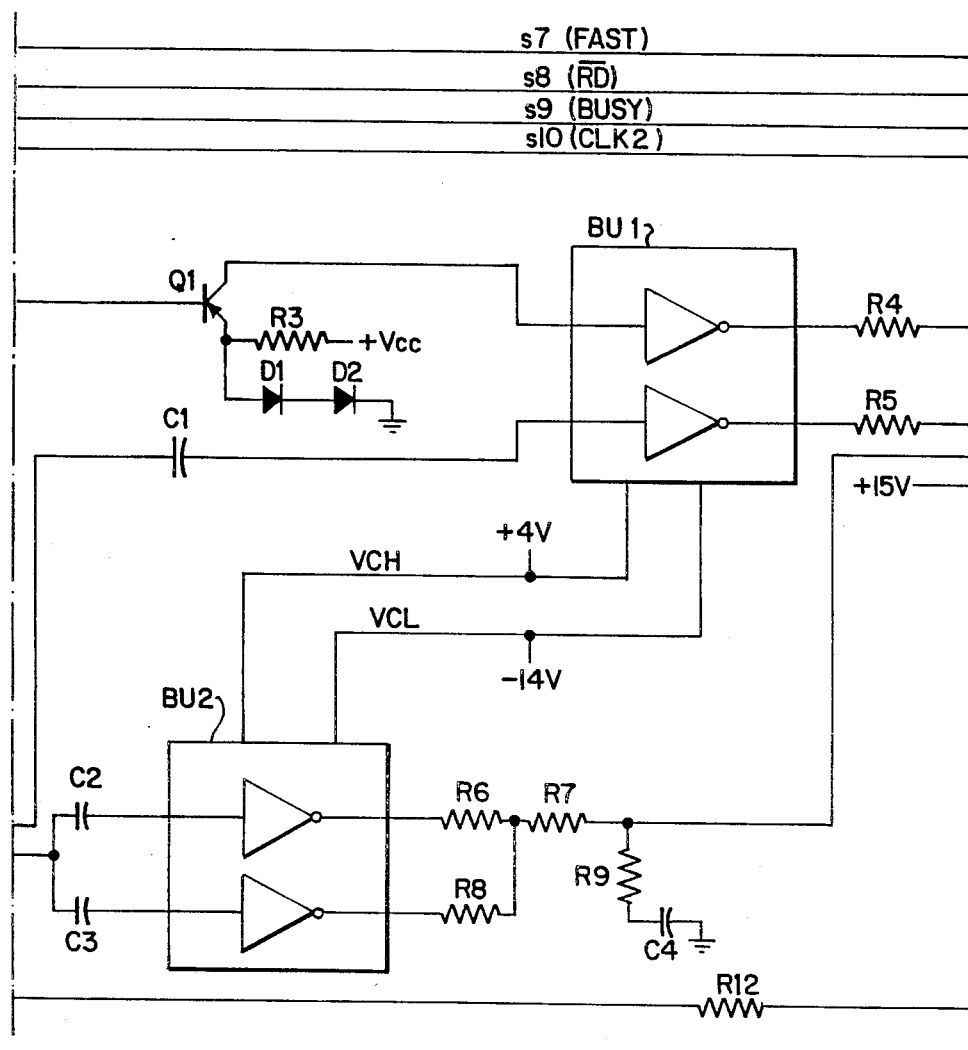

A more detailed diagram of CECD 11 appears in FIG. 3a, 3b and 3c which is as shown in FIG. 3d. Referring to FIG. 3a, an 8 Mhz crystal X1 and counter/oscillator IC1 produce 8 Mhz clock signal CLK 2 on s 10 used by Analog to Digital Conversion Means 21 (see FIGS. 2 and 4) for analog to digital conversion control, and 500 Khz clock signal CLK1 on s 15, fed to EPLD IC2, the latter of which produces all other timing signals. The circuitry shown in FIGS. 3a to 3c and CCD control signals produced by EPLID IC2 was designed around a CCD available from Texas Instruments Incorporated (their part designation being TC103), and with reference to Texas Instruments' related publication "Linear CCD Operation at 10 Mhz-Application Report SOCA002". The EPLD is programmed to use a relatively fast, 500 Khz exposure clock for timing the exposure of the CCD; and a relatively slow, 15.625 Khz, output clock to clock the data out of the CCD. This dual clock design was used since a fast clock was required to perform the CCD timing. However a computer designated PC 45 in FIG. 2, and used to perform signal processing and signal combining functions as indicated in FIG. 2, required a relatively slow clock for data transfer. In FIGS. 3a to 3c, the driver circuits used for producing CCD clock signals XCK' on s20, RCK' on s21, and TCK' on s22, from EPLD IC2 signals XCK on s18, *RCK on s16, and *TCK on s17 are in accordance with guidelines from Texas Instruments publication referred to above and in case will be easily understood by those skilled in the art. WRCK' on s23 has been tied to +15V since a white reference signal is not required in this design. CCD clock signals 'XCK on s20, RCK' on s21, TCK' on s22, and WRCK' on s23, along with power sources on s24 and s25, comprise CCDCTL, placed upon six line bus b1 which, in turn, supplies them to CCD 16 of FIG. 2, for appropriate exposure and data transfer timing.

WRCK on s19 from EPLD IC2 is inverted by gate G2 to form CSTART on s6 which informs FIG. 5c (PC I/O interface 25 of FIG. 2) of the start of a CCD scan. BYTE signal on s5, which indicates to FIG. 5c when a new CCD digitized data value is valid, is set upon a positive transition of BUSY on s9, sent by FIG. 4. A0 on s2, A1 on s3 and CS on s4 from FIG. 5c indicate when the latest digital value has been read by PC 45 of FIG. 2, and are used by EPLD IC2 to reset the BYTE signal on s5. FAST signal on s7, which is high during the 500 Khz exposure clock, informs FIG. 4 of the current clock speed. *RD on s8 informs FIG. 4 when a new CCD analog data value is available for processing. Transistor Q2, potentiometer P3, and resistors R12 and R13 produce EXPOSURE signal on line S1 for driving CCD illumination LED D1 of FIG. 2 during the 500 Khz exposure clock.

Referring now to FIG. 2, light 12 from light emitting diode LED1 forming part of optical source 8 passes through lens 13 which serves to collimate the light to within a small dispersion angle. The collimated light passes through optical grating 14, falling upon CCD 16. The grating 14, consisting of alternating equally spaced transparent and opaque regions, is positioned between lens 13 and CCD 16 in a manner that causes the transmitted light to fall upon CCD 16 in a spatially periodic intensity pattern, the primary wavelength of which is slightly larger than the spacing of each CCD pixel. By this arrangement of spacings, the analog electronic signal (analog in voltage, spatially sampled, clocked out discrete in time) OS on s11 outputted by CCD 16 serially to Analog to Digital Conversion Means 21 has a fundamental wavelength approximately equal to the CCD array length. It is the relative changes of this intensity pattern, affected by displacements of grating 14 that are measured by the phase detector.

Analog to Digital Conversion Means 21 of FIG. 2 converts each analog CCD value to an 8 bit digital value.

Figure 4:
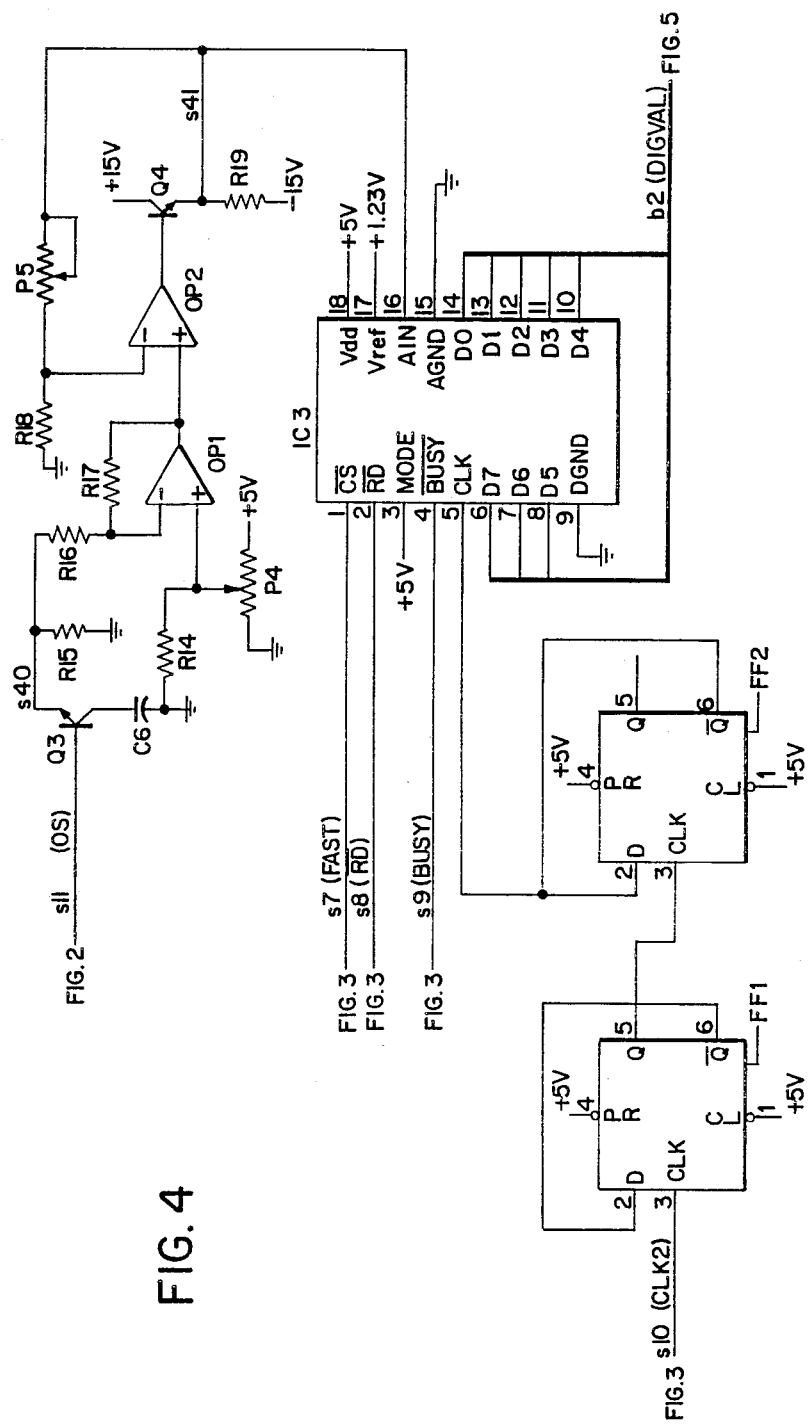
FIG. 4 shows in more detail the analog to digital conversion means of FIG. 2.

Referring now to FIG. 4 showing Analog to Digital Conversion Means 21 in more detail, the output analog signal OS from CCD 16 of FIG. 2 appears on s11 and is fed through emitter follower Q3 to operational amplifier OP1 and its associated circuitry. Amplifier OP1 subtracts a DC voltage (set by potentiometer P4), from the buffered CCD signal on s40 and gives the resultant value to OP2. OP2 amplifies this signal and passes the result through current driver Q4 to analog to digital converter IC3 via s41. (In the embodiment shown, IC3 is an integrated circuit chip available from Analog Devices Inc.—their part designation being AD7576). Q4 acts to minimize the noise thrown back onto s41 by IC3. Potentiometer P5 sets the gain of OP2 and Q4. The 8 bit digital equivalent of the analog signal on s41 is determined by IC3 and is passed in a parallel form via b2 to FIG. 5c. BUSY pulse on s9 which is passed to FIG. 3c, is set to a low level on a low pulse of conversion request *RD on s8 from FIG. 3a, and is reset to high when analog to digital conversion by IC3 is complete. Analog to digital conversion is triggered by *RD on s8 from FIG. 3c, but will be inhibited by a FAST signal on s7 from FIG. 3c during the 500 Khz exposure clock since IC3 has difficulty operating properly at this rate. It should be noted that a different (faster) IC3 chip could be used to keep up to the 500 Khz clock. However, speed limits set by the maximum rate of data transfer to PC 45 would still be present. Flip flops FF1 and FF2 divided the 8 Mhz clock on s10 from FIG. 3 by a factor of four and present this 2 Mhz clock to IC3 for conversion and reset timing.

PC I/O interface (PC101) 25 of FIG. 2 is an input-/output interface allowing PC 45 to communicate to the rest of the apparatus. PC101 25 is logically accessed by PC 45 via IBM PC prototype I/O space addresses 300H, 302H, and 303H.

Figure 5A:
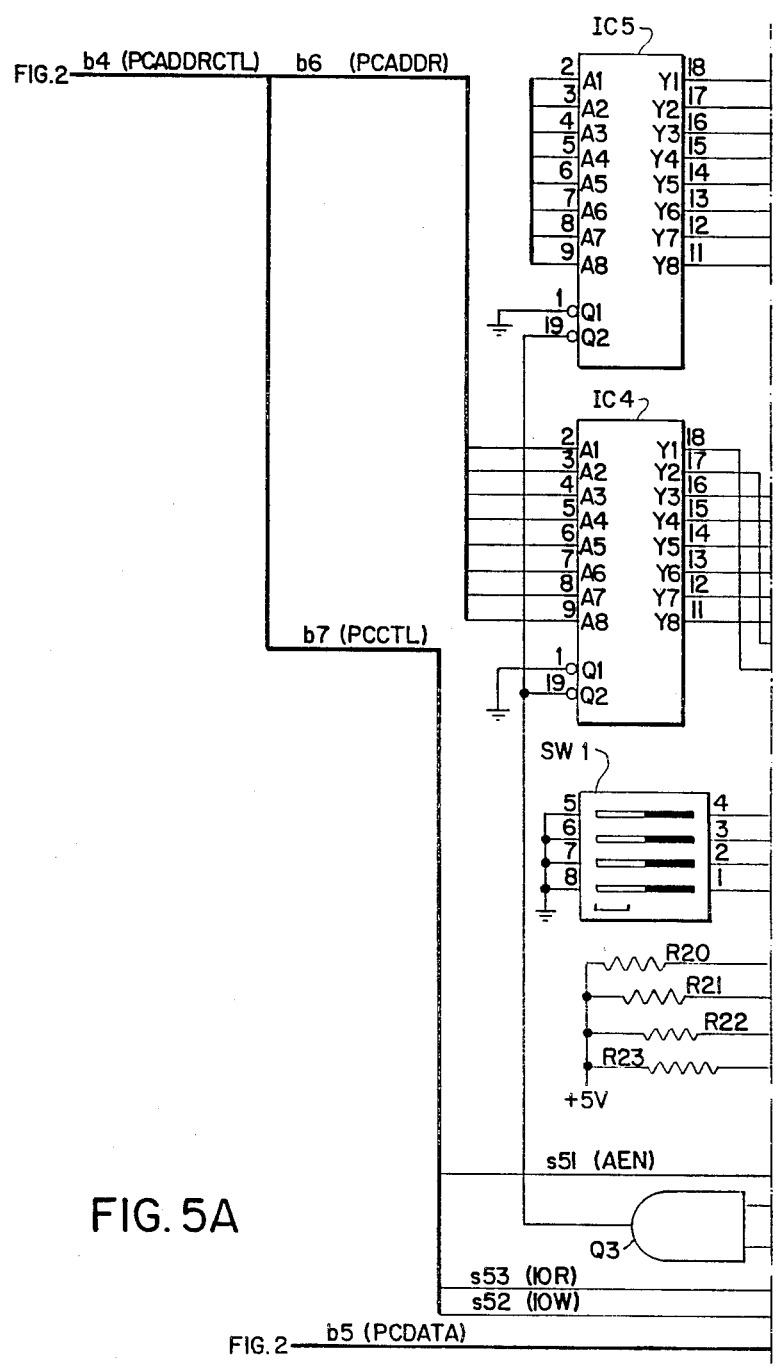
Figure 5B:
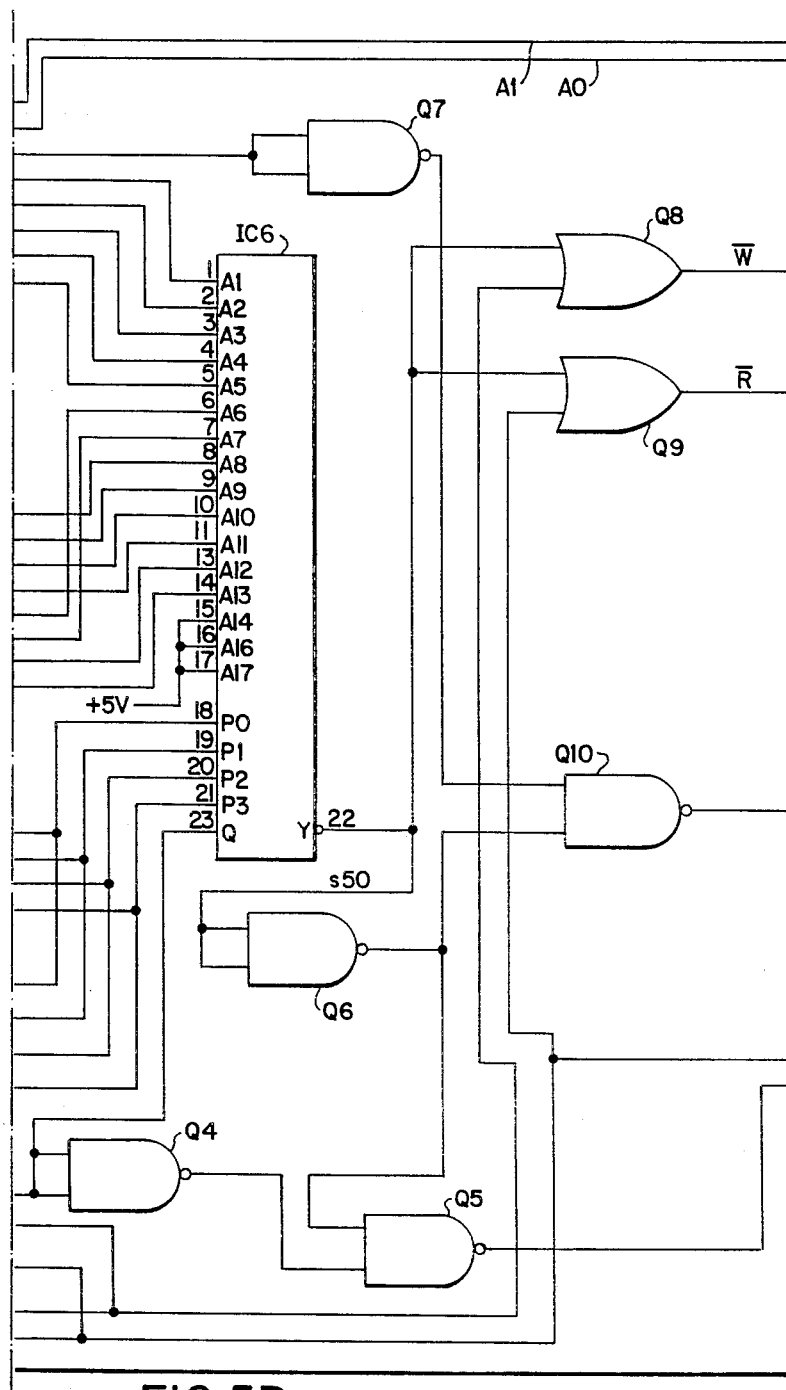

Referring now to FIG. 5a, 5b and 5c oriented as shown in FIG. 5d, a more detailed diagram of PC101 25, interface chip IC8 connects either 8 bit DIGVAL on bus b2 from FIG. 4 to the whole of, or BYTE on s5 and CSTART on s6 from FIG. 3a to two members of, 8 line data bus (PCDATA)5b of PC 45 of FIG. 2 to allow data transfer from FIG. 4 or FIG. 3a respectively to PC 45. DIGVAL on bus b2 is connected when the address on PCADDR bus 6b is 300H. BYTE on s5 and CSTART on s6 are connected when the address on PCADDR bus 6pb is 302H. Address 303H on PCADDR bus b6 allows the mode of interface chip IC8 to be set. Bus transceiver IC7 is used to drive PCDATA b5. Buffers IC4 and IC5 connect the 16 address lines of address and control circuitry. The 13 highest address lines are connected to demultiplexor IC6 which produces an enabling pulse on s50 when the correct address appears on the 13 lines. SW1 sets the address value. PC control lines AEN on s51, IOW on s52, IOR on s53 from PCADDRCTL b4 ensure that the I/O operations occur at the appropriate times.

Circuits similar to those depicted in FIGS. 2 through 5d were constructed using the following component values:

| PARTS LIST | |
|---|---|
| X1 | 8 MHZ |
| CCD 16 | TC103, TEXAS INSTRUMENTS |

-continued
PARTS LIST

| | INCORPORATED |
|---|---|
| D1, D2 | IN4148 |
| LED 1 | H-2000, STANLEY ELECTRIC CO., LTD. |
| Q1 | 2N3906 |
| Q2, Q3, Q4 | 2N3904 |
| OP1, OP2 | LM347 |
| FF1, FF2 | 74HC74 |
| BU1, BU2 | 75369 |
| G1, G2 | 73HC04 |
| G3 | 74LS08 |
| G4, G5, G6, G7, G10 | 75HC00 |
| G8, G9 | 74HC32 |
| IC1 | 74HC4060 |
| IC2 | EP900, ALTERA CORPORATION |
| IC3 | AD7576, ANALOG DEVICES INC. |
| IC4, IC5 | 74HCT541 |
| IC6 | 74ALS677 |
| IC7 | 74HCT245 |
| IC8 | 82C55, INTEL CORPORATION |
| SW1 | DIP4 |
| C1, C2, C3, C5 | 10 µF |
| C4 | 100 pF |
| C6, C7 | 0.1 µF |
| R1 | 10 Mohms 5% |
| R2 | 330 ohms 5% |
| R3 | 390 ohms 5% |
| R4, R5, R6, R7, R8 | 22 ohms 5% |
| R9 | 10 ohms 5% |
| R11, R12, R14, R16 | 10 Kohms 5% |
| R13, R15 | 4.7 Kohms 5% |
| R17, R20, R21, R22, R23 | 10 Kohms 5% |
| R18 | 1 Kohm 5% |
| R19 | — — — |
| | 1.5 Kohms 5% |
| R24 | 1 Mohm 5% |
| P2, P5 | 5 Kohms 5% |
| P3, P4 | 1 Kohm 5% |

The Altera Corporation EPLD EP900 chip used in the present embodiment of the invention (viz. IC2) can be easily programmed by those skilled in the art. "LISTING—EPLD PROGRAM" which follows hereinafter is a listing of the equations and variable declarations used to programme IC2 (Altera Corporation EPLD EP900 chip) to perform the circuit timing functions for the particular embodiment shown. Such listing is followed by a listing of pin allocations for the chip after design, and a listing of the macrocell interconnection cross reference for the chip.

SOFTWARE DESCRIPTION

Software portion 46 of the linear displacement sensor shown in FIG. 2, and which implements the Signal Processing Means 30 and Signal Combining Means 40 of FIG. 1 will now be described.

Such software performs signal processing for the calculation of the interpolated phase and the gross phase for each array of phase data that is read in from Analog to Digital Conversion Means 21 via PC101 25. It adds the two phase values thus obtained to form the exact phase of periodic intensity pattern 4 and thus an accurate measurement of the position of grating 14. Software 46 also controls the signals that PC 45 puts onto PCADDRCTL bus b4, for control of PC101 25.

The grass position is found by locating a reference mark scribed upon grating 14 (not shown in the drawings). The reference mark used in this case is a line at least twice as wide as the pitch of the grating. A moving boxcar averaging scheme applied to the phase data is used to locate the reference mark by detecting the position of the boxcar that gives the lowest value.

Two preferred methods are disclosed for calculating the interpolated phase. Variations and alternatives can undoubtedly be imaged and devised by those skilled in the art.

Figure 6:
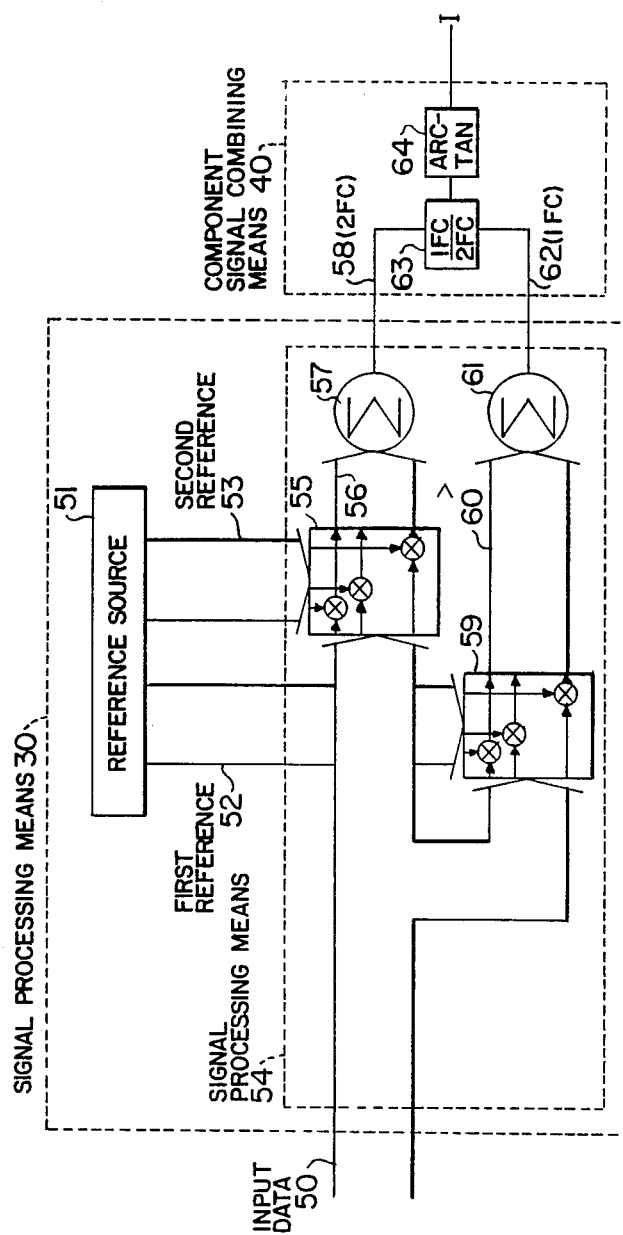
FIG. 6 shows a Fourier inner product embodiment of the Signal Processing Means and the Component Signal Combining Means of FIG. 1.

FIG. 6 is a block diagram of a preferred method for performing the phase interpolation process using a Fourier inner product scheme.

Signal Processing Means 54 (an included part of Signal Processing Means 30) performs the inner product of signal vector input data on line 50 with each of a first reference signal 52 and second reference signal 53, signals 52 and 53 being independent. More particularly, multiplier 59 multiplies each member of the signal vector on 50 by a corresponding member of first reference signal 52. The resulting product array on 60 is summed by summer 61, producing on line 62 a first Fourier component (1FC) (the inner product of the signal vector on 50 with the first reference signal 52). Similarly, multiplier 55 multiplies each member of the signal vector on 50 by a corresponding member of second reference signal 53. The resulting product array on 56 is summed by summer 57, producing on line 58 a second Fourier component (2FC) (the inner product of the signal vector 50 with the 2nd reference signal vector on 53). First reference signal 52 is a stored value of signal vector 50, taken when the sensor is in a calibration or 'zero' position. Second reference signal 53 is constructed by reference source 51 to be orthoganol to (and therefore independent to) first reference signal 52. By these choices of reference signals, the interpolated phase of the optical signal can be obtained simply by taking the arctangent of the result of dividing 1FC on line 62 by 2FC on line 58. The division and arctangent processes are performed by units 63 and 64 forming part of Signal Combining Means 40.

The design of an appropriate software program to implement the signal processing and signal combining functions called for in the arrangement of FIG. 6 will be readily within the ability of those skilled in the art. In relation to the present embodiment of FIG. 6, one such program has been written in the known programming language "C", and in particular the Microsoft C Version 40 programming language available from Microsoft Corporation. The listing for such program follows hereinafter under the heading "LISTING—INNER PRODUCT".

Figure 7:
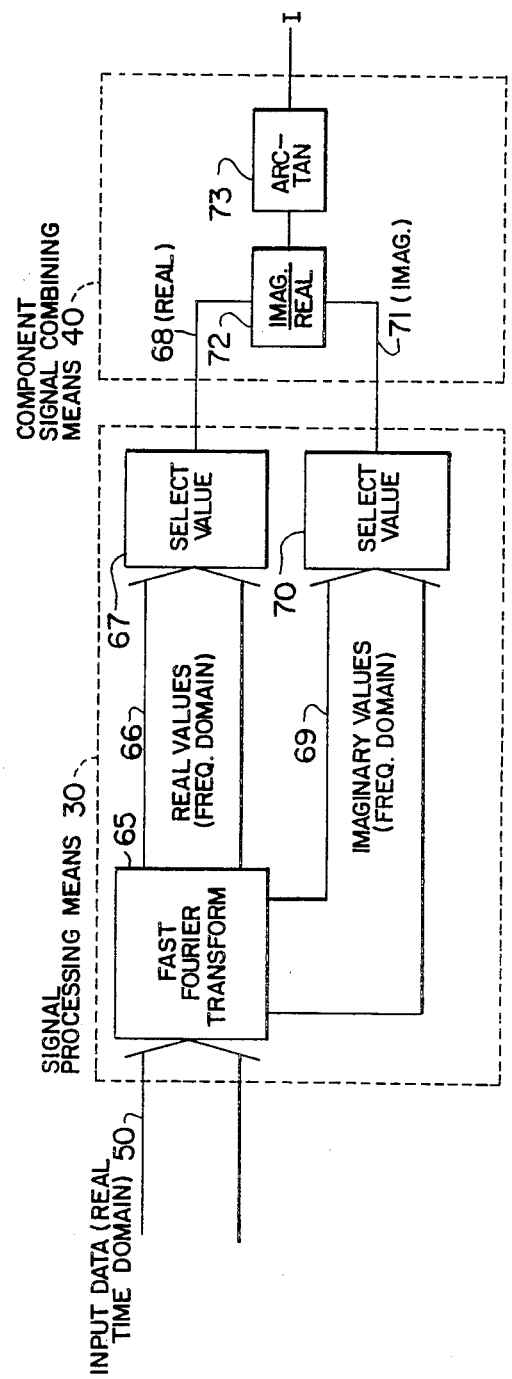
FIG. 7 shows a Fast Fourier Transform preferred embodiment of the Signal Processing Means and the Component Signal Combining Means of FIG. 1.

FIG. 7 is a block diagram of a preferred method for performing the phase interpolation process using a Fast Fourier Transfrom (FFT) scheme.

FFT 65 calculates the Fast Fourier Transform of the signal vector on 50 (2048 time domain data points) to produce 2048 real frequency values (RFV) on 66 and 2048 imaginary frequency values (IFV) on 69. An appropriate real value REAL on line 68 is selected by Select Value 67 and a corresponding imaginary value IMAG on line 71 is selected by Select Value 70. The interpolated phase is then obtained simply by taking the arctangent of the result of dividing IMAG on line 71 by REAL on line 68. The division and arctangent processes are performed by 72 and 73. In this embodiment, Select Value 67 and 70 select the 512th values of RFV 66 and IFV 69, respectively. The 512th value was chosen since, upon viewing the analog data from CCD 16 of FIG. 2 (using an oscilloscope), it was noted that the smallest wavelength containing the required phase data was approximately equal to 4 times the sampling wavelength, which corresponds to a frequency ¼ the sampling frequency. Since the sampling frequency corresponds to the 2048th frequency data point, the sought after frequency is ¼ of this or at the 512th data point. It should be noted that changes in the geometry of the optics of the device could change the frequency component that contains the phase information, thus changing the position within the 2048 frequency domain array that contains the phase information.

As in the case of software for the inner product embodiment (FIG. 6), the design of an appropriate software program to implement the signal processing and signal combining functions called for in the FFT arrangement of FIG. 7 will be readily within the ability of those skilled in the art. A program listing for a suitable FFT program, again written in the Microsoft C Version 40 programming language follows hereinafter under the heading "LISTING—FFT PROGRAM".

To a high degree the FFT PROGRAM is similar to the INNER PRODUCT PROGRAM. Where the INNER PRODUCT PROGRAM performs a Fourier inner product, the FFT PROGRAM performs an FFT operation. In practical versions built using these program, both have operated to approximately the same precision. However, it is believed that the INNER PRODUCT approach may ultimately be preferred over the FFT approach for the following reasons:

The INNER PRODUCT approach, by its construction of orthogonal reference vectors, automatically compensates for changes in the input signal vector, whereas the FFT approach requires the use of test equipment to characterize the input vector.

The INNER PRODUCT PROGRAM runs faster than the FFT PROGRAM, although programme B could be made to run as fast by the elimination of calculation steps other than those that produce the selected values used to determine phase (e.g. the 512th values as described above). The removal of such calculation steps would essentially produce a Fourier inner product of the input vector with a fixed frequency.

In the usual case, the data input will not be an ideal sinusoid. Hence, the appropriate phase data is distributed amongst more than one frequency. The INNER PRODUCT PROGRAM, by using the entire data input, utilizes all the phase data within the input vector, whereas the FFT PROGRAM limits itself to one frequency component. Accordingly, it should be possible to achieve higher accuracy with the INNER PRODUCT PROGRAM. However, it should be noted that for an ideal sinusoidal data input, the two programs should operate to the same precision.

Designed to be linked using Overlay Linker Version 3.51 software of Microsoft Corporation to both the INNER PRODUCT PROGRAM or the FFT PROGRAM assembly language routines "OUTB" and "INMAT" have been written and are listed hereinafter using the headings OUTB ROUTINE and INMAT ROUTINE, respectively. Routine OUTB serves to output a byte of data to the C programme specified port (in this case, address 303H) of computer PC 45. INMAT polls the status word addressed by 302H and when it is zero, reads a specified number of pixels (in this case 2081) from a specified port (in this case, address 300H) of computer PC 45.

Figure 8:
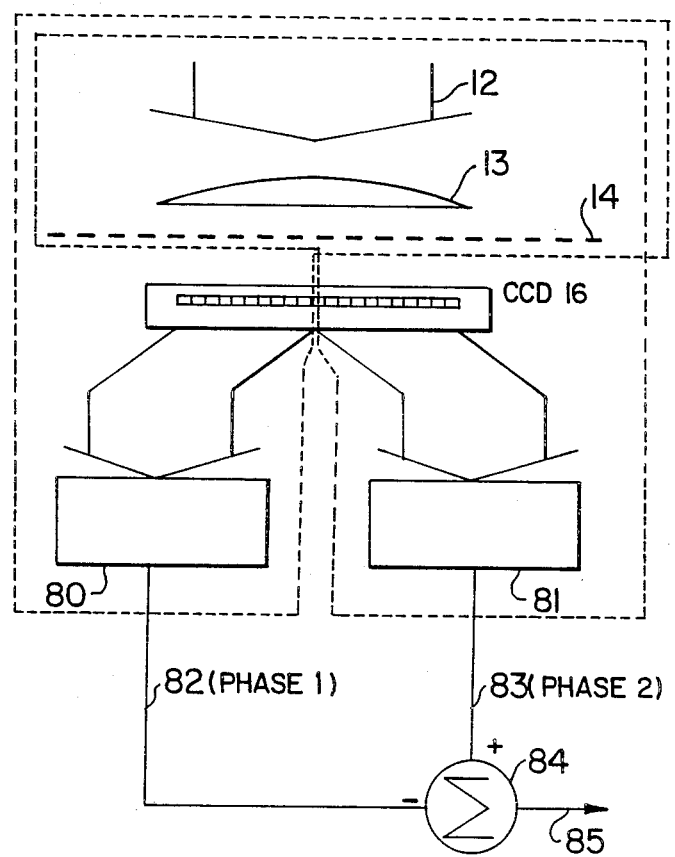
FIG. 8 shows a displacement sensor in accordance with the present invention, arranged in a configuration to measure a differential displacement.

Referring now to FIG. 8 which shows a displacement sensor in a configuration designed to measure a differential displacement, it will be seen that the structure bears marked similarities to that of the displacement sensor of FIG. 2. Two displacement measurements are being made by what may be thought of as first and second sensors arranged in opposition using opposed halves of CCD 16. However, they share a common optical source and common optical sensing means like the optical source and optical sensing means depicted in FIG. 2. Separation occurs at the output of CCD 16, one side of which is dedicated to a first processor 80 that embodies signal conditioning, signal processing and signal combining means like that forming part of the displacement sensor of FIG. 2, the other side of which is dedicated to a second processor 81 that likewise embodies such signal conditioning, signal processing and signal combining means (and the description of which will not be repeated here). Processor 80 produces an interpolated phase signal corresponding to the interpolated position of optical grating lines 14 relative to optical receptors on the left side of CCD 16 in FIG. 8 and which shows in output (PHASE 1) signal on line 82. Similarly, processor 81 produces an interpolated phase signal corresponding to the interpolated position of optical grating lines 14 relative to optical receptors on the right side of CCD 16 in FIG. 8 and which shows in output (PHASE 2) signal on line 83. PHASE 1 and PHASE 2 signals are then combined by summer 84, but the resulting signal on line 85 is a difference signal because, as can be seen, the negative of the PHASE 1 signal is summed with the positive of the PHASE 2 signal. If displacement as determined at the output of processor 80 is the same as the displacement determined at the output of processor 81, then the differential displacement as represented by the output signal on line 85 will be zero.

If the temperature coefficients of grating 14 and CCD 16 are different, then such an arrangement may be used for the detection of temperature induced dimension changes in a displacement sensor. If a measured differential displacement is zero, then it may be taken that the temperature is the same as a calibration temperature. However, if a measured differential displacement is not zero, then it may be taken that there has been a temperature induced dimension change because the outputs of processors 80 and 81 are derived from opposed halves of the same optical apparatus. Temperature induced dimension changes will affect each halve in an opposite fashion.

It will be readily understood that such temperature induced dimension changes will be a function of the amount of temperature change. Thus, in principle, it will be possible not only to detect that there has been a change but also to determine the amount of change, and to determine compensation factors to account for temperature changes. Such compensation factors may then be used, for example, to correct measurements obtained from a displacement sensor such as that shown in FIG. 2 in cases where there is in fact a material temperature change.

The present invention is not limited to the particular embodiments that have been described. Changes and departures from the embodiments as described will undoubtedly occur to those skilled in the art. While the use of digital processing and software in the implementation of the invention is considered desirable, those skilled in the art will realize that the invention may likewise be implemented without digital processing or associated software, and may, for example be implemented with analog circuitry. There are a variety of possible changes, departures or other modifications to the invention as has been described and which fall within the spirit and scope of the invention as defined in the claims.

LISTING – EPLD PROGRAM

PART:EP900

INPUTS:
    CLOCK1@1,
    CLOCK2@21,
    ENABLE@2,
    CLEAR@24,
    BUSY@3,
    A0@17,
    A1@18,
    CS1@19

OUTPUTS:
    QA@5,
    QB@6,
    Q0@7,
    Q1@8,
    Q2@9,
    Q3@10,
    Q4@11,
    Q5@12,
    Q6@13,
    Q7@14,
    Q8@15,
    Q9@16,
    Q10@25,
    Q11@26,
    Q12@27,
    Q13@28,
    Q14@29,
    EOC@30,
    FAST@31,
    BYTE@32,
    WRCK@33,
    XCK@34,
    !TCK@35,
    !RCK@36

NETWORK:
    CLOCK1=INP(CLOCK1)
    CLOCK2=INP(CLOCK2)
    ENABLE=INP(ENABLE)
    CLEAR=INP(CLEAR)
    BUSY=INP(BUSY)
    A0=INP(A0)
    A1=INP(A1)
    CS1=INP(CS1)
    QA,QAf=TOTF(QAt,CLOCK1,CLEAR,GND,VCC)
    QB,QBf=TOTF(QBt,CLOCK1,CLEAR,GND,VCC)
    Q0,Q0f=TOTF(Q0t,CLOCK1,CLEAR,GND,VCC)
    Q1,Q1f=TOTF(Q1t,CLOCK1,CLEAR,GND,VCC)
    Q2,Q2f=TOTF(Q2t,CLOCK1,CLEAR,GND,VCC)
    Q3,Q3f=TOTF(Q3t,CLOCK1,CLEAR,GND,VCC)
    Q4,Q4f=TOTF(Q4t,CLOCK1,CLEAR,GND,VCC)
    Q5,Q5f=TOTF(Q5t,CLOCK1,CLEAR,GND,VCC)
    Q6,Q6f=TOTF(Q6t,CLOCK1,CLEAR,GND,VCC)
    Q7,Q7f=TOTF(Q7t,CLOCK1,CLEAR,GND,VCC)
    Q8,Q8f=TOTF(Q8t,CLOCK1,CLEAR,GND,VCC)
    Q9,Q9f=TOTF(Q9t,CLOCK1,CLEAR,GND,VCC)
    Q10,Q10f=TOTF(Q10t,CLOCK2,CLEAR,GND,VCC)
    Q11,Q11f=TOTF(Q11t,CLOCK2,CLEAR,GND,VCC)
    Q12,Q12f=TOTF(Q12t,CLOCK2,CLEAR,GND,VCC)
    Q13,Q13f=TOTF(Q13t,CLOCK2,CLEAR,GND,VCC)
    Q14,Q14f=TOTF(Q14t,CLOCK2,CLEAR,GND,VCC)

FAST,FASTf=TOTF(FASTt,CLOCK2,CLEAR,GND,VCC)

XCK=RONF(XCKd,CLOCK2,CLEAR,GND,VCC)
!TCK=RONF(TCKd,CLOCK2,CLEAR,GND,VCC)
!RCK=RONF(RCKd,CLOCK2,CLEAR,GND,VCC)
WRCK=RONF(WRCKd,CLOCK2,CLEAR,GND,VCC)
BYTE=RONF(BYTEd,GRAB,ACK,GND,VCC)
GRAB=CLKB(GRABB)
EOC,EOCf=RORF(EOCd,CLOCK2,CLEAR,GND,VCC)

EQUATIONS:

QAt=(ENABLE*/EOCf)
    +(QAf*EOCf);
QBt=(ENABLE*QAf*/EOCf)
    +(QBf*EOCf);
Q0t=(ENABLE*QAf*/EOCf*QBf)
    +(Q0f*EOCf);
Q1t=(ENABLE*QAf*/EOCf*QBf*Q0f)
    +(Q1f*EOCf);
Q2t=(ENABLE*QAf*/EOCf*QBf*Q0f*Q1f)
    +(Q2f*EOCf);
Q3t=(ENABLE*QAf*/EOCf*QBf*Q0f*Q1f*Q2f)
    +(Q3f*EOCf);
Q4t=(ENABLE*QAf*/EOCf*QBf*Q0f*Q1f*Q2f*Q3f)
    +(Q4f*EOCf);
Q5t=(ENABLE*QAf*/EOCf*QBf*Q0f*Q1f*Q2f*Q3f*Q4f)
    +(Q5f*EOCf);
Q6t=(ENABLE*QAf*/EOCf*QBf*Q0f*Q1f*Q2f*Q3f*Q4f*Q5f)
    +(Q6f*EOCf);
Q7t=(ENABLE*QAf*/EOCf*QBf*Q0f*Q1f*Q2f*Q3f*Q4f*Q5f*Q6f)
    +(Q7f*EOCf);
Q8t=(ENABLE*QAf*/EOCf*QBf*Q0f*Q1f*Q2f*Q3f*Q4f*Q5f*Q6f*Q7f)
    +(Q8f*EOCf);
Q9t=(ENABLE*QAf*/EOCf*QBf*Q0f*Q1f*Q2f*Q3f*Q4f*Q5f*Q6f*Q7f*Q8f)
    +(Q9f*EOCf);
Q10t=(ENABLE*QAf*/EOCf*QBf*Q0f*Q1f*Q2f*Q3f*Q4f*Q5f*Q6f*Q7f*Q8f*Q9f)
    +(Q10f*EOCf);
Q11t=(ENABLE*QAf*/EOCf*QBf*Q0f*Q1f*Q2f*Q3f*Q4f*Q5f*Q6f*Q7f*Q8f*Q9f*Q10f)
    +(Q11f*EOCf);
Q12t=(ENABLE*QAf*/EOCf*QBf*Q0f*Q1f*Q2f*Q3f*Q4f*Q5f*Q6f*Q7f*Q8f*Q9f*Q10f*Q11f
    +(Q12f*EOCf);

Q13t=(ENABLE*QAf*/EOCf*QBf*Q0f*Q1f*Q2f*Q3f*Q4f*Q5f*Q6f*Q7f*Q8f*Q9f*Q10f*Q11f
    *Q12f)
    +(Q13f*EOCf);
Q14t=(ENABLE*QAf*/EOCf*QBf*Q0f*Q1f*Q2f*Q3f*Q4f*Q5f*Q6f*Q7f*Q8f*Q9f*Q10f*Q11f
    *Q12f*Q13f)
    +(Q14f*EOCf);

XCKd=(((FASTf*/Q0f*/Q1f*/Q2f*/Q3f*/Q4f*/Q5f*/Q6f*/Q7f*/Q8f*/Q9f
        */Q10f*/Q11f*/Q12f*/Q13f*/Q14f)
      +(FASTf*/QBf*Q0f*/Q1f*/Q2f*/Q3f*/Q4f*/Q5f*/Q6f*/Q7f*/Q8f
        */Q9f*/Q10f*/Q11f*/Q12f*/Q13f*/Q14f))
     +((/FASTf*/Q3f*/Q4f*/Q5f*/Q6f*/Q7f*/Q8f*/Q9f*/Q10f*/Q11f
        */Q12f*/Q13f*/Q14f)
      +(/FASTf*/Q2f*Q3f*/Q4f*/Q5f*/Q6f*/Q7f*/Q8f*/Q9f*/Q10f*/Q11f
        */Q12f*/Q13f*/Q14f)));

TCKd=/((FASTf*/Q0f)
     +(/FASTf*/Q3f));

RCKd=/((FASTf*/QAf*/QBf)
     +(/FASTf*/Q1f*/Q2f));

WRCKd=/((FASTf*/Q0f*/Q1f*/Q2f*/Q3f*/Q4f*/Q5f*/Q6f*/Q7f*/Q8f*/Q9f
        */Q10f*/Q11f*/Q12f*/Q13f*/Q14f)
     +(/FASTf*/Q3f*/Q4f*/Q5f*/Q6f*/Q7f*/Q8f*/Q9f
        */Q10f*/Q11f*/Q12f*/Q13f*/Q14f));

FASTt=EOCf;

EOCd=(FASTf*/QAf*QBf*Q0f*/Q1f*/Q2f*/Q3f*/Q4f*Q5f*/Q6f*/Q7f
    */Q8f*/Q9f*/Q10f*Q11f*/Q12f*/Q13f*/Q14f)
    +(/FASTf*/QAf*QBf*Q0f*Q1f*Q2f*/Q3f*/Q4f*/Q5f*/Q6f*/Q7f*Q8f*/Q9f*/Q10f
    */Q11f*/Q12f*/Q13f*Q14f);

GRABB=BUSY;

ACK=/A0*/A1*/CS1;

BYTEd=VCC;

END$

EPLD EP900 PIN ALLOCATIONS

```
            EP900
            - - - -
CLOCK1  -|  1    40|-  Vcc
ENABLE  -|  2    39|-  Gnd
  BUSY  -|  3    38|-  Gnd
   Gnd  -|  4    37|-  Gnd
    QA  -|  5    36|-  !RCK
    QB  -|  6    35|-  !TCK
    Q0  -|  7    34|-  XCK
    Q1  -|  8    33|-  WRCK
    Q2  -|  9    32|-  BYTE
    Q3  -|10    31|-  FAST
    Q4  -|11    30|-  EOC
    Q5  -|12    29|-  Q14
    Q6  -|13    28|-  Q13
    Q7  -|14    27|-  Q12
    Q8  -|15    26|-  Q11
    Q9  -|16    25|-  Q10
    A0  -|17    24|-  CLEAR
    A1  -|18    23|-  Gnd
   CS1  -|19    22|-  Gnd
   GND  -|20    21|-  CLOCK2
            - - - -
```

EPLD EP900 MACROCELL INTERCONNECTION CROSS REFERENCE

```
FEEDBACKS:
                                          M M M   M M M M M M M M M M M
                      M M M M M M M M M 1 1 1   1 1 1 1 1 1 2 2 2 2 2
                      1 2 3 4 5 6 7 8 9 0 1 2   3 4 5 6 7 8 9 0 1 2 3 4
!RCK .....  RONF @M1 -> . . . . . . . . . . . .   . . . . . . . . . . . . @36
!TCK .....  RONF @M2 -> . . . . . . . . . . . .   . . . . . . . . . . . . @35
 XCK .....  RONF @M3 -> . . . . . . . . . . . .   . . . . . . . . . . . . @34
WRCK .....  RONF @M4 -> . . . . . . . . . . . .   . . . . . . . . . . . . @33
BYTE .....  RONF @M5 -> . . . . . . . . . . . .   . . . . . . . . . . . . @32
FAST .....  TOTF @M6 -> * * * * . . * . . . . .   . . . . . . . . . . . . @31
 EOC .....  RORF @M7 -> . . . . . * . * * * * *   * * * * * * * * * * * * @30
 Q14 .....  TOTF @M8 -> . . * * . . * * . . . .   . . . . . . . . . . . . @29
 Q13 .....  TOTF @M9 -> . . * * . . * * * . . .   . . . . . . . . . . . . @28
 Q12 .....  TOTF @M10-> . . * * . . * * * * . .   . . . . . . . . . . . . @27
 Q11 .....  TOTF @M11-> . . * * . . * * * * * .   . . . . . . . . . . . . @26
 Q10 .....  TOTF @M12-> . . * * . . * * * * * *   . . . . . . . . . . . . @25
```

```
QA ....... TOTF @M13-> * . . . . . * * * * * *    * * * * * * * * * * * * @5
QB ....... TOTF @M14-> * . * . . . * * * * * *    . * * * * * * * * * * * @6
Q0 ....... TOTF @M15-> . * * * . . * * * * * *    . . * * * * * * * * * * @7
Q1 ....... TOTF @M16-> * . * * . . * * * * * *    . . . * * * * * * * * * @8
Q2 ....... TOTF @M17-> * . * * . . * * * * * *    . . . . * * * * * * * * @9
Q3 ....... TOTF @M18-> . * * * . . * * * * * *    . . . . . * * * * * * * @10
Q4 ....... TOTF @M19-> . . * * . . * * * * * *    . . . . . . * * * * * * @11
Q5 ....... TOTF @M20-> . . * * . . * * * * * *    . . . . . . . * * * * * @12
Q6 ....... TOTF @M21-> . . * * . . * * * * * *    . . . . . . . . * * * * @13
Q7 ....... TOTF @M22-> . . * * . . * * * * * *    . . . . . . . . . * * * @14
Q8 ....... TOTF @M23-> . . * * . . * * * * * *    . . . . . . . . . . * * @15

Q9 ....... TOTF @M24-> . . * * . . * * * * * *    . . . . . . . . . . . * @16

INPUTS:

CLOCK1 ... CKR @1  -> . . . . . . . . . . . .    * * * * * * * * * * * *
ENABLE ... INP @2  -> . . . . . . * * * * *      * * * * * * * * * * * *
BUSY ..... INP @3  -> . . . . * . . . . . . .    . . . . . . . . . . . .
A0 ....... INP @17 -> . . . . * . . . . . . .    . . . . . . . . . . . .
A1 ....... INP @18 -> . . . . * . . . . . . .    . . . . . . . . . . . .
CS1 ...... INP @19 -> . . . . * . . . . . . .    . . . . . . . . . . . .
CLOCK2 ... CKR @21 -> * * * * . * * * * * * *    . . . . . . . . . . . .
CLEAR .... INP @24 -> * * * * . * * * * * * *    * * * * * * * * * * * *
                      ! ! X W B F E Q Q Q Q Q    Q Q Q Q Q Q Q Q Q Q Q Q
                      R T C R Y A 0 1 1 1 1 1    A B 0 1 2 3 4 5 6 7 8 9
                      C C K C T S C 4 3 2 1 0
                      K K   K E T
```

LISTING - INNER PRODUCT PROGRAM

```
#include <stdio.h>
#include <fcntl.h>
#include <sys/types.h>
#include <sys/stat.h>
#include <io.h>
#include <math.h>
#include <conio.h>
include <stdlib.h> define RONCHI_SPACE    508000          /* ronchi spacing in
                                           angstroms */
#define PI              3.141592654
#define BLANK           9               /* # pixels on either side
                                           of hole */
#define PIX             2048
#define BUFLEN          128             /* buffer for input from
                                           keyboard */
#define ROUND           8               /* buffer for input from
                                           keyboard */ extern outb(int,unsigned char);
                /* assem lang routine that allows set up of
                   the vernier */ extern inmat(unsigned char far *);
                /* assem lang routine that inputs all the
                   pixels */
```

```c
unsigned char far    input[PIX+4];    /* input data + 4 black level*/
double               clean[PIX];      /* data double form-no rms */
double               c1[PIX];         /* data double form-no rms */
double               gain[PIX];       /* field flatness adjust */
double               orth1[PIX];      /* look up table */
double               orth2[PIX];      /* look up table */ main()
{ int gross;              /* gross position in ronchi-spacings */
int grosszero;          /* zero gross position in pixel
                           spacings */
double fine;            /* fine position in angstroms */
int samples=1;          /* # of samples */
int ch;                 /* keyboard input */
char buffer[BUFLEN];    /* buffer for key board input */
char *result;           /* for reading strings from console */
int loop;
int cycle;
int fh;                 /* file handle */
int num;                /* error trapping on files */
int wave;               /* wavelength */
FILE *stream;
int multi;

int radix=10;
char *p;
int count=0;

int setgain(double *,double *,unsigned char far *,int);

int vread(unsigned char far *,double *,double *,int);

int makeorth(unsigned char far *,double *,double *,double
*,double *,int,int);

double calc(double *,double *,double *,int);

/* *********** main start ************ */ setup();

fh=open("wave.dat",O_RDONLY|O_BINARY);
if(fh==-1)
   {
   printf("Having problems reading wave.dat \n");
   printf("Commencing rebuild of wave.dat \n");
   printf("new value for quarter wavelength?>\n");
   if((result=gets(buffer))&&(*result)) wave=atoi(result);
   ch=getch();
   printf("thank you \n\n");
   fh=open("wave.dat",O_WRONLY|O_BINARY|O_CREAT,S_IREAD|S_IWRITE);
   write(fh,&wave,sizeof(int));
   close(fh);
   } else
   {
   if((num=read(fh,&wave,sizeof(int))) == -1)
       {
       perror("");
       exit(1);
       }
   close(fh);
   }
```

```
fh=open("gain.dat",O_RDONLY|O_BINARY);
if(fh==-1)
   {
   printf("Having problems reading gain.dat \n");
   printf("Commencing rebuild of gain.dat \n");
   printf("please remove carriage-strike a key when ready \n");
   ch=getch();
   printf("thank you\n");
   samples=100;
   setgain(gain,clean,input,samples);
   fh=open("gain.dat",O_WRONLY|O_BINARY|O_CREAT,S_IREAD|S_IWRITE);
   printf("file handle is %d \n",fh);
   write(fh,gain,PIX*8);
   close(fh);
   }
else
   {
   if((num=read(fh,gain,PIX*8)) == -1)
       {
       perror("");
       exit(1);
       }
   close(fh);
   } printf("Please position the carriage to the selected zero position\n");
printf("Strike any key when ready - press 'a' to abort\n");
ch=getch();
printf("thank you\n\n");

grosszero=makeorth(input,clean,gain,orth1,orth2,samples,wave);

samples=1;
   do{
   printf("(Z)ero, e(X)it, (C)hange sampling(#=%i), (V)ernier measure , (M)ulti-measure\n",samples);
   printf("command?>\n");
   ch=getch();

switch(ch)
         {
         case 'z':
                printf("Please position the carriage to the selected zero position\n");
                printf("Strike any key when ready - press 'a' to abort process\n\n");
                ch=getch();
                if (ch=='a') break;

grosszero=makeorth(input,clean,gain,orth1,orth2,samples,wave);
                printf("gross value is %d\n\n",grosszero);
                break;
         case 'x':
                break;
         case 'c':
                printf("new value?>\n");
                if((result=gets(buffer))&&(*result))
samples=atoi(result);
                break;
         case 'v':
                printf("thank you \n");
                gross=vread(input,clean,gain,samples);
                gross=(gross-grosszero)/4;
                fine=calc(clean,orth1,orth2,gross);
                printf("measurement =%20.4f angstroms\n",fine);
                break;
```

```
                case 'm':
                    stream=fopen("data.dat","wt");
                    printf("thank you \n");
                    printf("number reads? >\n");
                    if((result=gets(buffer))&&(*result))
multi=atoi(result);
                    for(loop=0;loop<multi;loop++)
                      {
                    gross=vread(input,clean,gain,samples);
                    gross=(gross-grosszero)/4;
                    fine=calc(clean,orth1,orth2,gross);
                    fprintf(stream," %10.4f \n",fine);
                    if((num=kbhit())!=0) break;
                      }
                    fclose(stream);
                    break;
            }
    }
    while(ch!='x');

}  /*    ****************** end main ************* */

/* ***************** functions start here **************** */

/*=====================================
                 *  sets up the gain file and saves away
                 *  the gain is adjusted for CCD response
                 *  of flat field 800H (=2048) has multisample
                 *  capabilities.
                 =====================================*/ setgain(gainptr,readptr,inptr,times)

double *gainptr;
    double *readptr;
    unsigned char far *inptr;
    int times;

{
    double total=0.0;
    double semiblack=0.0;
    int loop1;
    int loop2;
    int fh;
                                            /*initialize work space */
        for(loop1=0;loop1<PIX;loop1++)
            *(readptr+loop1)=0.0;

/*multi sample the port */
        for(loop1=0;loop1<times;loop1++)
            { inmat((unsigned char far *)inptr);

for(loop2=0;loop2<PIX;loop2++)
                *(readptr+loop2)+=*(inptr+loop2);
            for(loop2=PIX;loop2<PIX+4;loop2++)
                semiblack+=*(inptr+loop2);
            } for(loop2=0;loop2<PIX;loop2++)
                *(readptr+loop2) /= (double)times;
            for(loop2=0;loop2<PIX;loop2++)
                semiblack /= 4.0*(double)times;

/* remove black level */
```

```c
       for(loop1=0;loop1<PIX;loop1++)
           *(readptr+loop1) -= semiblack;

/* find dc level */
       for(loop1=0;loop1<PIX;loop1++)
           total+= *(readptr+loop1);

total/=(double)PIX;
                                            /* calculates  gain */
                                            /* note no ronchi present */
                                            /* calculates field flatness */
       for(loop1=0;loop1<PIX;loop1++)
          *(gainptr+loop1)=total/(*(readptr+loop1));

}

/*===================================
                          reads in the data and returns
                          double float value in readptr
                          that has been gain and dc level
                          adjusted zeros out the hole from
                          ronchi gross position.
                          ===================================*/ int vread(inptr,readptr,gainptr,times)

unsigned char far *inptr;

double *readptr;
double *gainptr;
int times;

{
 double total=0.0;
 int    loop1;
 int    loop2;
 double value;
 int place;
 int lower;
 int upper;
 double semiblack=0.0;
 double temp;
 int fh;
 int ch;

/* initialize work space */
for(loop1=0;loop1<PIX;loop1++)
   *(readptr+loop1)=0.0;

/*multi sample the port */
for(loop1=0;loop1<times;loop1++)
   { inmat((unsigned char far *)inptr);

for(loop2=0;loop2<PIX;loop2++)
      *(readptr+loop2) += *(inptr+loop2);
   for(loop2=PIX;loop2<PIX+4;loop2++)
      semiblack += *(inptr+loop2);
   } for(loop2=0;loop2<PIX;loop2++)
      *(readptr+loop2) /= (double)times;
   for(loop2=0;loop2<PIX;loop2++)
      semiblack /= 4.0*(double)times;

/* remove black level   */
                                            /*  & pixel gain adjust */
```

```
for(loop1=0;loop1<PIX;loop1++)
   {
   *(readptr+loop1)-=semiblack;
   *(readptr+loop1)*=(*(gainptr+loop1));
   }

/* find hole */
value=0.0;
for(loop1=0;loop1<4;loop1++)
    value += *(readptr+loop1);

value /= 4.0;
value *= (double)(2*BLANK-1);    /* initial comparision
                                    value */ place=0;
for(loop1=BLANK;loop1<PIX-BLANK;loop1++)
    {
    temp=0.0;
    for(loop2=0;loop2<BLANK;loop2++)
    {
    temp+= *(readptr+loop1+loop2);
    temp+= *(readptr+loop1-loop2);
    }
    temp-= *(readptr+loop1);

if ( temp<value)
        {
        place=loop1;
        value=temp;
        }
    }
                     /* find upper and lower bounds on hole*/
upper=place+BLANK;
if(upper>PIX-1) upper=PIX-1;

lower=place-BLANK;
if(lower<0) lower=0;

/* knock out hole & */
                                    /* remove dc bias */
for(loop1=0;loop1<PIX;loop1++)
   if(loop1>=lower && loop1<=upper);
   else total+= *(readptr+loop1);

total/=(double)PIX-2*BLANK+1;

for(loop1=0;loop1<PIX;loop1++)
   if(loop1>=lower && loop1<=upper) *(readptr+loop1)=0.0;
   else *(readptr+loop1)-= total;

/* normalize */
total=0.0;
for(loop1=0;loop1<PIX;loop1++)
   total+= *(readptr+loop1) * *(readptr+loop1);

total=sqrt(total);

for(loop1=0;loop1<PIX;loop1++)
   *(readptr+loop1) /=total;

return(place);
}

/*====================================
                makes up two orthogonal vectors for
                the composite vectors on the ccd
``` does its own reading and adjustments
and returns the grosszero value
====================================*/

```c
int makeorth(inptr,readptr,gainptr,orth1ptr,orth2ptr,times,wave)

unsigned char far *inptr;
    double *readptr;
    double *gainptr;
    double *orth1ptr;
    double *orth2ptr;
    int times;
    int wave;
    {
     double total=0.0;
     int   loop1;
     int   loop2;
     double value;
     int place;
     int lower;
     int upper;
     double semiblack=0.0;
     double temp;
     double inner1;
     double inner2;
     int fh;
                                        /* initialize work space */
    for(loop1=0;loop1<PIX;loop1++)
       *(readptr+loop1)=0.0;

if(times<=0) times=1;
                                        /*multi sample the port */
    for(loop1=0;loop1<times;loop1++)
        { inmat((unsigned char far *)inptr);

for(loop2=0;loop2<PIX;loop2++)
           *(readptr+loop2) += *(inptr+loop2);
        for(loop2=PIX;loop2<PIX+4;loop2++)
           semiblack += *(inptr+loop2);
        } for(loop2=0;loop2<PIX;loop2++)
           *(readptr+loop2) /= (double)times;
        for(loop2=0;loop2<PIX;loop2++)
           semiblack /= 4.0*(double)times;

/* remove black level   */
                                        /*  & pixel gain adjust */
    for(loop1=0;loop1<PIX;loop1++)
        {
        *(readptr+loop1)-=semiblack;
        *(readptr+loop1)*=(*(gainptr+loop1));
        }

/* find hole */
    value=0.0;
    for(loop1=0;loop1<4;loop1++)
        value += *(readptr+loop1);

value /= 4.0;

value *= (double)(2*BLANK-1);    /* initial comparision
                                        value */
```

```
for(loop1=BLANK;loop1<PIX-BLANK;loop1++)
    {
      temp=0.0;
    for(loop2=0;loop2<BLANK;loop2++)
      {
      temp+= *(readptr+loop1+loop2);
      temp+= *(readptr+loop1-loop2);
      }
      temp-= *(readptr+loop1);

if ( temp<value)
        {
        place=loop1;
        value=temp;
        }
    }
                            /* find upper and lower bounds on hole*/
upper=place+BLANK;
if(upper>PIX-1) upper=PIX-1;

lower=place-BLANK;
if(lower<0) lower=0;

/* knock out hole & */
                                        /* remove dc bias */
for(loop1=0;loop1<PIX;loop1++)
  if(loop1>=lower && loop1<=upper);
  else total+= *(readptr+loop1);

total/= (double)PIX-2*BLANK+1;

for(loop1=0;loop1<PIX;loop1++)
  if(loop1>=lower && loop1<=upper) *(readptr+loop1)=0.0;
  else *(readptr+loop1)-=total;

/* normalize */
total=0.0;
for(loop1=0;loop1<PIX;loop1++)
   total+= *(readptr+loop1) * *(readptr+loop1);

total=sqrt(total);

for(loop1=0;loop1<PIX;loop1++)
   *(readptr+loop1) /=total;

/* 1st orth pointer */
 for(loop1=0;loop1<PIX;loop1++)
    *(orth1ptr+loop1)= *(readptr+loop1);

/* 2nd orth pointer */
 for(loop1=0;loop1<PIX;loop1++)
  *(orth2ptr+loop1)= *(orth1ptr+(loop1+wave)%PIX);

inner1=0.0;
inner2=0.0;

for(loop1=0;loop1<PIX;loop1++)
    {
    inner1+= *(orth1ptr+loop1) * *(orth1ptr+loop1);
    inner2+= *(orth2ptr+loop1) * *(orth1ptr+loop1);
    } printf("before inner1 product is = %f\n",inner1);
printf("before inner2 product is = %f\n",inner2);
inner2 /= inner1;
```

```
 for(loop1=0;loop1<PIX;loop1++)
    *(orth2ptr+loop1)-= inner2 * *(orth1ptr+loop1);

/* normalize orth2 */
total=0.0;
for(loop1=0;loop1<PIX;loop1++)
   total+= *(orth2ptr+loop1) * *(orth2ptr+loop1);

total=sqrt(total);

for(loop1=0;loop1<PIX;loop1++)
   *(orth2ptr+loop1) /=total;

inner2=0.0;
  for(loop1=0;loop1<PIX;loop1++)
     inner2+= *(orth2ptr+loop1) * *(orth1ptr+loop1);

printf("inner product is = %f\n",inner2);
  return(place);

/*===================================
                          calculates the displacements
                          returns the value of distance
                          in angstroms
                       ===================================*/ double calc(readptr,orth1ptr,orth2ptr,coarse)

double *readptr;
    double *orth1ptr;
    double *orth2ptr;
    int coarse;

{
    int   loop;
    double inner1=0.0;
    double inner2=0.0;
    double angle;
    double plastic;

for(loop=0;loop<PIX;loop++)
       {
       inner1+= *(readptr+loop) * *(orth1ptr+loop);
       inner2+= *(readptr+loop) * *(orth2ptr+loop);
       } angle=atan2(inner2,inner1);

plastic=(double) RONCHI_SPACE*((double)coarse -
angle/(2.0*PI));

return(plastic);

}

/*===================================
                          sets up the 8255
                      ===================================*/
setup()
    {
     outb(0X0303,0X9B);
    }
```

LISTING - FFT PROGRAM

```c
#include <stdio.h>
#include <fcntl.h>
#include <sys/types.h>
#include <sys/stat.h>
#include <io.h>
#include <math.h>
#include <conio.h>
include <stdlib.h> define RONCHI_SPACE    508000          /* ronchi spacing in
                                           angstroms */
#define PI              3.141592654
#define BLANK           8               /* # pixels on either side
                                           of hole */
#define PIX             2048
#define BUFLEN          128             /* buffer for input from
                                           keyboard */
#define ROUND           8               /* buffer for input from
                                           keyboard */
#define RATIO           0.0039370078    /* angstroms to micro
                                           inches */ extern outb(int,unsigned char);
                /* assem lang routine that allows set up of
                   the vernier */ extern inmat(unsigned char far *);
                /* assem lang routine that inputs all the
                   pixels */ unsigned char far   input[PIX+4];   /* input data + 4 black
                                       level*/
double              gain[PIX];      /* field flatness adjust */
double              fr[PIX];        /* real array for playing
                                       around */
double              fi[PIX];        /* complex array for playing
                                       around */ main()
{ int gross;                  /* gross position in ronchi-spacings
                               */
int grosszero;              /* zero gross position in pixel
                               spacings */
double fine;                /* fine position in angstroms   */
double finezero;            /* zero fine position in angstroms   */
int samples=1;              /* # of samples */
int ch;                     /* keyboard input */
char buffer[BUFLEN];        /* buffer for key board input */
char *result;               /* for reading strings from console */
int loop;
int cycle;
int fh;                     /* file handle */
int num;                    /* error trapping on files */
int wave;                   /* wavelength */
FILE *stream;
int multi;
double measure;             /* measure    */
int radix=10;
char *p;
int count=0;
double inches;
```

```c
int setgain(double *,double *,unsigned char far *,int);

void calc(double *,int *,double *,unsigned char far *,double
*,double *,int);

/* ********** main start ************ */ setup();

fh=open("gain.dat",O_RDONLY|O_BINARY);
if(fh==-1)
   {
   printf("Having problems reading gain.dat \n");
   printf("Commencing rebuild of gain.dat \n");
   printf("please remove carriage-strike a key when ready \n");
   ch=getch();
   printf("thank you\n");
   samples=100;
   setgain(gain,fr,input,samples);
   fh=open("gain.dat",O_WRONLY|O_BINARY|O_CREAT,S_IREAD|S_IWRITE);
   printf("file handle is %d \n",fh);
   write(fh,gain,PIX*8);
   close(fh);
   }
else
   {
   if((num=read(fh,gain,PIX*8)) == -1)
       {
       perror("");
       exit(1);
       }
   close(fh);
   } printf("Please position the carriage to the selected zero
position\n");
printf("Strike any key when ready - press 'a' to abort\n");
ch=getch();
printf("thank you\n\n");

calc(gain,&grosszero,&finezero,input,fr,fi,samples);
samples=1;
   do{
     printf("(Z)ero, e(X)it, (C)hange sampling(#=%i), (V)ernier
measure , (M)ulti-measure\n",samples);
     printf("command?>\n");
     ch=getch();

switch(ch)
         {
         case 'z':
               printf("Please position the carriage to the
selected zero position\n");
               printf("Strike any key when ready - press 'a' to
abort process\n\n");
               ch=getch();
               if (ch=='a') break;
               printf("thank you\n");

calc(gain,&grosszero,&finezero,input,fr,fi,samples);
               break;
         case 'x':
               break;
         case 'c':
               printf("new value?>\n");
               if((result=gets(buffer))&&(*result))
```

```c
samples=atoi(result);
                break;
        case 'v':
                printf("thank you\n");
                calc(gain,&gross,&fine,input,fr,fi,samples);

measure=(double)RONCHI_SPACE*((double)((gross-grosszero)/4) -
(fine-finezero));
                inches=RATIO* measure;
                printf("measurement =%20.2f angstroms =%12.6f
                        microinches\n",measure,inches);
                break;
        case 'm':
                stream=fopen("data.dat","wt");
                printf("thank you \n");
                printf("number reads? >\n");
                if((result=gets(buffer))&&(*result))
multi=atoi(result);
                for(loop=0;loop<multi;loop++)
                   {
                calc(gain,&gross,&fine,input,fr,fi,samples);

measure=(double)RONCHI_SPACE*((double)((gross-grosszero)/4) -
(fine-finezero));
                fprintf(stream," %10.4f \n",measure);
                if((num=kbhit())!=0) break;
                   }
                fclose(stream);
                break;

}
    }
   while(ch!='x');

}  /*     ****************** end main ************* */

/*  ***************  functions start here **************** */

/*====================================
                 * sets up the gain file and saves away
                   the gain is adjusted for CCD response
                   of flat field 800H (=2048) has multisample
                   capabilities.
                 ====================================*/ int setgain(gainptr,readptr,inptr,times)

double *gainptr;
    double *readptr;
    unsigned char far *inptr;
    int times;

{
    double total=0.0;
    double semiblack=0.0;
    int loop1;
    int loop2;
    int fh;
                                        /*initialize work space */
     for(loop1=0;loop1<PIX;loop1++)
        *(readptr+loop1)=0.0;

/*multi sample the port */
```

```c
    for(loop1=0;loop1<times;loop1++)
       { inmat((unsigned char far *)inptr);

for(loop2=0;loop2<PIX;loop2++)
         *(readptr+loop2)+=*(inptr+loop2);
       for(loop2=PIX;loop2<PIX+4;loop2++)
         semiblack+=*(inptr+loop2);
       } for(loop2=0;loop2<PIX;loop2++)
         *(readptr+loop2) /= (double)times;
       for(loop2=0;loop2<PIX;loop2++)
         semiblack /= 4.0*(double)times;

/* remove black level */
    for(loop1=0;loop1<PIX;loop1++)
       *(readptr+loop1) -= semiblack;

/* find dc level */
    for(loop1=0;loop1<PIX;loop1++)
       total+= *(readptr+loop1);

total/=(double)PIX;
                                       /* calculates  gain */
                                       /* note no ronchi present */
                                       /* calculates field flatness */
    for(loop1=0;loop1<PIX;loop1++)
       *(gainptr+loop1)=total/(*(readptr+loop1));

}

/*===================================
                       reads in the data and returns
                       double float value in readptr
                       that has been gain and dc level
                       adjusted zeros out the hole from
                       ronchi gross position.
                     ===================================*/ void calc(gainptr,grossptr,fineptr,inptr,frptr,fiptr,times)

double           *gainptr;
     int              *grossptr;
     double           *fineptr;
     unsigned char far *inptr;
     double           *frptr;
     double           *fiptr;
     int              times;
     {
       double total=0.0;
       int   loop1;
       int   loop2;
       double value;
       int place;
       double semiblack=0.0;
       double temp;
       int fh;
       int ch;
       double range;         /* return value for function (fine
                                     value) */

/* initialize work space */
       for(loop1=0;loop1<PIX;loop1++)
         *(frptr+loop1)=0.0;
```

```
for(loop1=0;loop1<PIX;loop1++)
  *(fiptr+loop1)=0.0;

/*multi sample the port */
for(loop1=0;loop1<times;loop1++)
   {
   inmat((unsigned char far *)inptr);

for(loop2=0;loop2<PIX;loop2++)
      *(frptr+loop2) += *(inptr+loop2);
   for(loop2=PIX;loop2<PIX+4;loop2++)
      semiblack += *(inptr+loop2);
   } for(loop2=0;loop2<PIX;loop2++)
      *(frptr+loop2) /= (double)times;
   for(loop2=0;loop2<PIX;loop2++)
      semiblack /= 4.0*(double)times;

/* remove black level       */
                                 /* & do pixel gain adjust   */
for(loop1=0;loop1<PIX;loop1++)
   {
   *(frptr+loop1)-=semiblack;
   *(frptr+loop1) *= (*(mainptr+loop1));
   }

/* find hole */
value=0.0;
for(loop1=0;loop1<4;loop1++)
    value += *(frptr+loop1);

value /= 4.0;

value *= (double)(2*BLANK-1);    /* initial comparision
                                    value  */ place=0;
for(loop1=BLANK;loop1<PIX-BLANK;loop1++)
   {
   temp=0.0;
   for(loop2=0;loop2<BLANK;loop2++)
      {
       temp+= *(frptr+loop1+loop2);
       temp+= *(frptr+loop1-loop2);
      }
   temp-= *(frptr+loop1);

if ( temp<value)
       {
       place=loop1;
       value=temp;
       }
   }

*grossptr=place;              /* return value for
                                    grossptr position*/ fft(frptr,fiptr,PIX);

range = atan2(*(fiptr+512),*(frptr+512))/ (2.0*PI);
    if(range<0.0) range += 1.0;

*(fineptr)=range;
}
```

```c
/*====================================
    sets up the 8255
====================================*/
setup()
    {
     outb(0X0303,0X9B);
    }

/*====================================
    does the fft
====================================*/ fft (real, imag, size)

double real[];
double imag[];
int    size;
    {
    double tempr, tempi, coefr, coefi, twopi, theta;
    double sin(), cos();
    int    n, n1, m, msb, width, j, i, period;

twopi = 2.0*3.1415926;
    n = size - 1;
    n1 = n-1;
    msb = size/2;
    j=0;
    for (i = 0; i<=n1; i++)
        {
        if (j>i)
            {
                tempr = real[j];
                tempi = imag[j];
                real[j] = real[i];
                imag[j] = imag[i];
                real[i] = tempr;
                imag[i] = tempi;
            }
    m = msb;
    for (; j & m ;)
            {
            j = j ^ m;
            m = m >> 1;
            }
    j = j | m;
    }
width = 1;
for (;width <= n;)
    {
    period = width << 1;
    for (m=0; m < width; m++)
            {
            theta = twopi*m/period;
            coefr = cos(theta);
            coefi = sin(theta);
            for (i=m; i<= n; i = i+period)
                {
                j = i + width;
                tempr = coefr*real[j] - coefi*imag[j];
                tempi = coefr*imag[j] + coefi*real[j];
                real[j] = real[i] - tempr;
                imag[j] = imag[i] - tempi;
                real[i] = real[i] + tempr;
                imag[i] = imag[i] + tempi;
                }
            }
    width = period;
    }
}
```

.OUTB ROUTINE

```
INCLUDE DOS.MAC
INCLUDE CMACROS.INC sBegin   CODE
assumes CS,CODE
assumes DS,DATA
;-----------------------------------------------------
;   outb - write a byte out to a port
;
;   synopsis:   outb(port, val);
;               int  port;
;               BYTE val;
;-----------------------------------------------------

IF     SizeC
cProc    outb,<FAR,PUBLIC>
         ELSE
cProc    outb,<NEAR,PUBLIC>
         ENDIF parmW    port
parmB    val cBegin   outb push   ax
         push   dx mov    dx, port         ; load port address
         mov    al, val          ; move data into register
         out    dx, al           ; write out data pop    dx
         pop    ax
cEnd     outb sEnd     CODE end
```

INMAT ROUTINE

```
INCLUDE DOS.MAC
INCLUDE CMACROS.INC sBegin   CODE
assumes CS,CODE
assumes DS,DATA ;-----------------------------------------------------
;   inmat - read "count" words from port "dataport"
;           "dataport" is read when the byte read from
;           port "statusport" is zero. starts the read only
;           after
;
;   synopsis:   inmat(str*);
;               char *str;  /* pointer where data is to be
;                              stored  */
;-----------------------------------------------------
```

```
        IF      SizeC
cProc   inmat,<FAR,PUBLIC>,<si,di>
        ELSE
cProc   inmat,<NEAR,PUBLIC>,<si,di>
        ENDIF parmW   xoff
parmW   xseg cBegin  inmat
        pushf
        push    ax
        push    bx
        push    cx
        push    dx
        push    ds
        push    es
        mov     di, xoff
        mov     ds, xseg mov     ax, 0300H
        mov     es, ax              ; will be used to swap into DX
        mov     si, 0302H           ;   ditto mov     dx, si              ; load status port cld
        cli
check:
        in      al, dx              ; read in status
        rol     al, 1               ; find status-begin of scan
        jnb     check
        mov     cx, 0014H           ; number of items
strip:
        in      al, dx              ; read in data
        ror     al, 1               ; find status-begin of sample
        jnb     strip mov     dx, es              ; load data port
        in      al, dx              ; input lower data byte
        mov     dx, si              ; load status port
        loop    strip               ; strip just rips off the
                                    ; first 20 pixels mov     cx, 0800H           ; number of items
loop:
        in      al, dx              ; read in data
        ror     al, 1               ; find status-begin of sample
        jnb     loop mov     dx, es              ; load data port
        in      al, dx              ; input lower data byte
        mov     [ds:di], al         ; store lower data byte
        inc     di                  ; index storage location
        mov     dx, si              ; load status port
        loop    loop mov     cx, 0004H           ; number of items
peel:
        in      al, dx              ; read in data
        ror     al, 1               ; find status-begin of sample
        jnb     peel mov     dx, es              ; load data port
        in      al, dx              ; input lower data byte
        mov     dx, si              ; load status port
        loop    peel                ; strip just peels off 4
```

```
pixels
                mov     cx, 0004H           ; number of items
black:
                in      al, dx              ; read in data
                ror     al, 1               ; find status-begin of sample
                jnb     black mov     dx, es              ; load data port
                in      al, dx              ; input lower data byte
                mov     [ds:di], al         ; store lower data byte
                inc     di                  ; index storage location
                mov     dx, si              ; load status port
                loop    black sti
                pop     es                  ; restore registers
                pop     ds
                pop     dx
                pop     cx
                pop     bx
                pop     ax
                popf
cEnd            inmat sEnd    CODE end
```

We claim:

1. A displacement sensor, comprising:
   (a) an optical source including a plurality of optical grating lines for producing from an incident optical signal a transmitted optical signal having a spatially periodic intensity pattern;
   (b) optical sensng means for receiving said transmitted signal as an input across a plurality of optical receptors of said sensing means, and for providing as an output in response thereto a corresponding plurality of receptor output signals, each such output signal corresponding to the amplitude of said transmitted signal as sensed by a corresponding one of said receptors, said optical receptors being spaced one from the other by a distance different from the fundamental spatial wavelength of said transmitted signal.
   (c) signal conditioning means operatively connected to said optical sensing means for receiving said receptor output signals as an input and for deriving a signal vector therefrom;
   (d) signal processing means operatively connected to said signal conditioning means for deriving first and second independent component signals from said signal vector; and,
   (e) signal combining means operatively connected to said signal processing means for receiving said component signals and for combining same to produce an interpolated phase signal corresponding to the interpolated position of said grating lines relative to said optical receptors.

2. A displacement sensor as defined in claim 1, said optical source including:
   (a) means for producing optical energy; and,
   (b) means for collimating such energy into said incident optical signal.

3. A displacement sensor as defined in claim 2 wherein:
   (a) said optical receptors are charge storage elements for storing an electrical charge related to the intensity of optical energy incident on the elements; and,
   (b) said signal conditioning means comprises analog to digital conversion means for reading and converting analog signals corresponding to the magnitude of stored charge on each such element into corresponding digital signals.

4. A displacement sensor as defined in claim 3 wherein, said optical sensing means includes timing means operatively interconnected with said means for producing optical energy and said analog to digital conversion means:
   (a) for controlling the intensity of said optical energy; and,
   (b) for triggering said analog to digital conversion means to read said analog signals.

5. A displacement sensor as defined in claim 2 wherein, said signal processing means comprises:
   (a) a reference source for producing first and second independent reference signals;
   (b) means for producing said first independent component signal as the inner product of said signal vector with said first reference signal; and,
   (c) means for producing said second independent component signal as the inner product of said signal vector with said second reference signal.

6. A displacement sensor as defined in claim 5 wherein, said signal combining means comprises means for deriving a signal corresponding to the arctangent of the result of dividing said first independent component signal by said second independent component signal.

7. A displacement sensor as defined in claim 2 wherein, said signal processing means comprises:
   (a) signal transforming means for deriving real and imaginary frequency signal values from said signal vector;

(b) means for selecting an imaginary frequency signal value as said first independent component signal; and, (c) means for selecting a real frequency signal value as said second independent component signal.

8. A displacement sensor as defined in claim 7 wherein, said signal combining means comprises means for deriving a signal corresponding to the arctangent of the result of dividing said first independent component signal by said second independent component signal.

9. A displacement sensor, comprising:

(a) an optical source including a plurality of optical grating lines for producing from an incident optical signal a transmitted optical signal having a spatially periodic intensity pattern;

(b) optical sensing means for receiving said transmitted signal as an input across a plurality of optical receptors of said sensing means, and for providing as an output in response thereto a corresponding plurality of receptor output signals, each such output signal corresponding to the amplitude of said transmitted signal as sensed by a corresponding one of said receptors, said optical receptors being spaced one from the other by a distance different from the fundamental spatial wavelength of said transmitted signal.

(c) first and second signal conditioning means operatively connected to said optical sensing means for receiving, respectively, first and second sets of said receptor output signals as inputs and for deriving, respectively, first and second signal vectors therefrom;

(d) first and second signal processing means operatively connected to said first and second signal conditioning means, respectively, each such signal processing means for deriving first and second independent component signals from the signal vector derived by its associated signal conditioning means;

(e) first signal combining means operatively connected to said first signal processing means for receiving the component signals derived by said first signal processing means and for combining same to produce a first interpolated phase signal corresponding to the interpolated position of said grating lines relative to the optical receptors producing said first set of said receptor output signals;

(f) second signal combining means operatively connected to said second signal processing means for receiving the component signals derived by said second signal processing means and for combining same to produce an interpolated phase signal corresponding to a second interpolated position of said grating lines relative to the optical receptors producing said second set of said receptor output signals; and, (g) means for combining said first and second interpolated phase signals.

10. A displacement sensor as defined in claim 9 wherein said means for combining said first and second interpolated signals produces a signal related to the difference between said first and second interpolated signals.

* * * * *

UNITED STATES PATENT AND TRADEMARK OFFICE
CERTIFICATE OF CORRECTION

PATENT NO. : 4,845,496

DATED : July 4, 1989

INVENTOR(S) : Roger G. Dower, et al.

It is certified that error appears in the above-identified patent and that said Letters Patent is hereby corrected as shown below:

Column 3, line 40, "(DSM)" should be --(OSM)--.

Column 4, line 48, "withreference" should be --with reference--.

Column 4, line 60, "1" should be --11--.

Column 6, line 32, "divided" should be --divide--.

Column 6, line 46, "5b" should be --b5--.

Column 6, line 48, "6b" should be --b6--.

Column 6, line 50, "6pb" should be --b6--.

Column 9, line 55, "using" should be --under--.

Signed and Sealed this

Second Day of April, 1991

*Attest:*

HARRY F. MANBECK, JR.

*Attesting Officer*       *Commissioner of Patents and Trademarks*